United States Patent
Jovanovic

(10) Patent No.: US 10,796,490 B2
(45) Date of Patent: *Oct. 6, 2020

(54) METHOD FOR PROVIDING SCALE TO ALIGN 3D OBJECTS IN 2D ENVIRONMENT

(71) Applicant: Atheer, Inc., Mountain View, CA (US)

(72) Inventor: Milos Jovanovic, Portland, OR (US)

(73) Assignee: Atheer, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,021

(22) Filed: Jan. 9, 2019

(65) Prior Publication Data

US 2019/0147660 A1 May 16, 2019

Related U.S. Application Data

(63) Continuation of application No. 14/710,554, filed on May 12, 2015, now Pat. No. 10,216,355, which is a continuation-in-part of application No. 14/251,503, filed on Apr. 11, 2014, now abandoned, which is a continuation-in-part of application No. 13/552,658, filed on Jul. 19, 2012, now abandoned.

(60) Provisional application No. 61/660,730, filed on Jun. 17, 2012, provisional application No. 61/992,629, filed on May 13, 2014, provisional application No. 61/992,759, filed on May 13, 2014, provisional application No. 61/992,719, filed on May 13, 2014, provisional application No. 61/992,774, filed on May 13, 2014, provisional application No. 61/992,746, filed on May 13, 2014, provisional application No. 61/992,665, filed on May 13, 2014.

(51) Int. Cl.
| | | |
|---|---|---|
| G06T 19/00 | (2011.01) | |
| G06Q 50/00 | (2012.01) | |
| G06F 3/0481 | (2013.01) | |
| G06F 3/0484 | (2013.01) | |
| G06F 3/0488 | (2013.01) | |

(52) U.S. Cl.
CPC ........ *G06T 19/006* (2013.01); *G06F 3/04815* (2013.01); *G06F 3/04845* (2013.01); *G06F 3/04883* (2013.01); *G06Q 50/01* (2013.01); *G06T 2210/04* (2013.01)

(58) Field of Classification Search
CPC ............ G06F 3/04815; G06F 3/04845; G06F 3/04883; G06T 19/006
See application file for complete search history.

(56) References Cited

U.S. PATENT DOCUMENTS

| | | | |
|---|---|---|---|
| 6,532,021 | B1 | 3/2003 | Tognazzini et al. |
| 7,043,695 | B2 | 5/2006 | Elber et al. |
| 7,523,411 | B2 | 4/2009 | Carlin |
| 7,583,275 | B2 | 9/2009 | Neumann et al. |
| 8,935,328 | B2 | 1/2015 | Tumuluri |
| 9,129,433 | B1 | 9/2015 | Korobkin |
| 2004/0105573 | A1 | 6/2004 | Neumann et al. |

(Continued)

*Primary Examiner* — Sarah Lhymn
(74) *Attorney, Agent, or Firm* — Miller IP Law, LLC

(57) ABSTRACT

Example systems and methods for virtual visualization of a three-dimensional (3D) model of an object in a two-dimensional (2D) environment. The method may include projecting a ray from a user device to a ground plane and determining an angle at which the projected ray touches the ground plane. The method further helps determine a level for the ground plane for positioning the 3D model of the object in the 2D environment.

20 Claims, 13 Drawing Sheets

(56) References Cited

U.S. PATENT DOCUMENTS

| | | |
|---|---|---|
| 2009/0243957 A1 | 10/2009 | Ni et al. |
| 2009/0313584 A1* | 12/2009 | Kerr .................. G06F 3/012 715/849 |
| 2012/0086727 A1 | 4/2012 | Korah et al. |
| 2012/0120113 A1 | 5/2012 | Hueso |
| 2012/0182286 A1 | 7/2012 | Wang |
| 2013/0212538 A1 | 8/2013 | Lemire et al. |
| 2013/0243306 A1* | 9/2013 | Falco, Jr. ............ G06T 19/006 382/154 |
| 2013/0300740 A1* | 11/2013 | Snyder ................ G06F 3/016 345/420 |
| 2013/0321407 A1 | 12/2013 | Jenkins et al. |
| 2014/0176537 A1 | 6/2014 | Densham |
| 2015/0170260 A1 | 6/2015 | Lees et al. |
| 2015/0310662 A1 | 10/2015 | Arcas et al. |

* cited by examiner

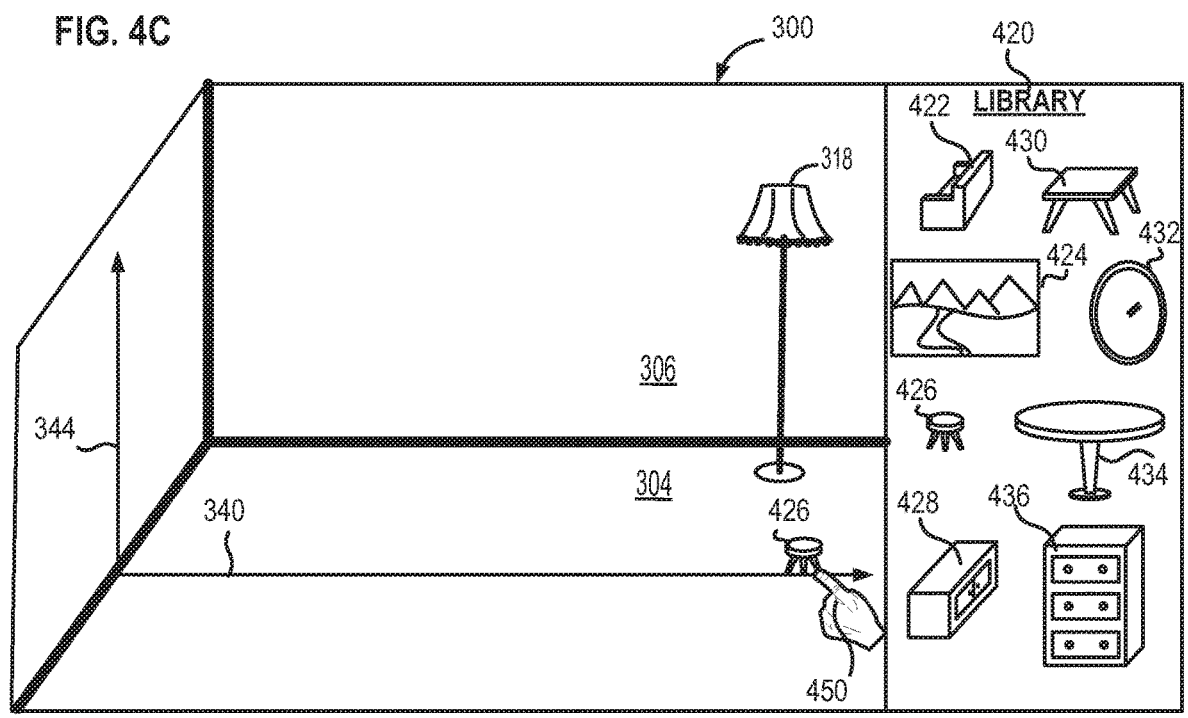

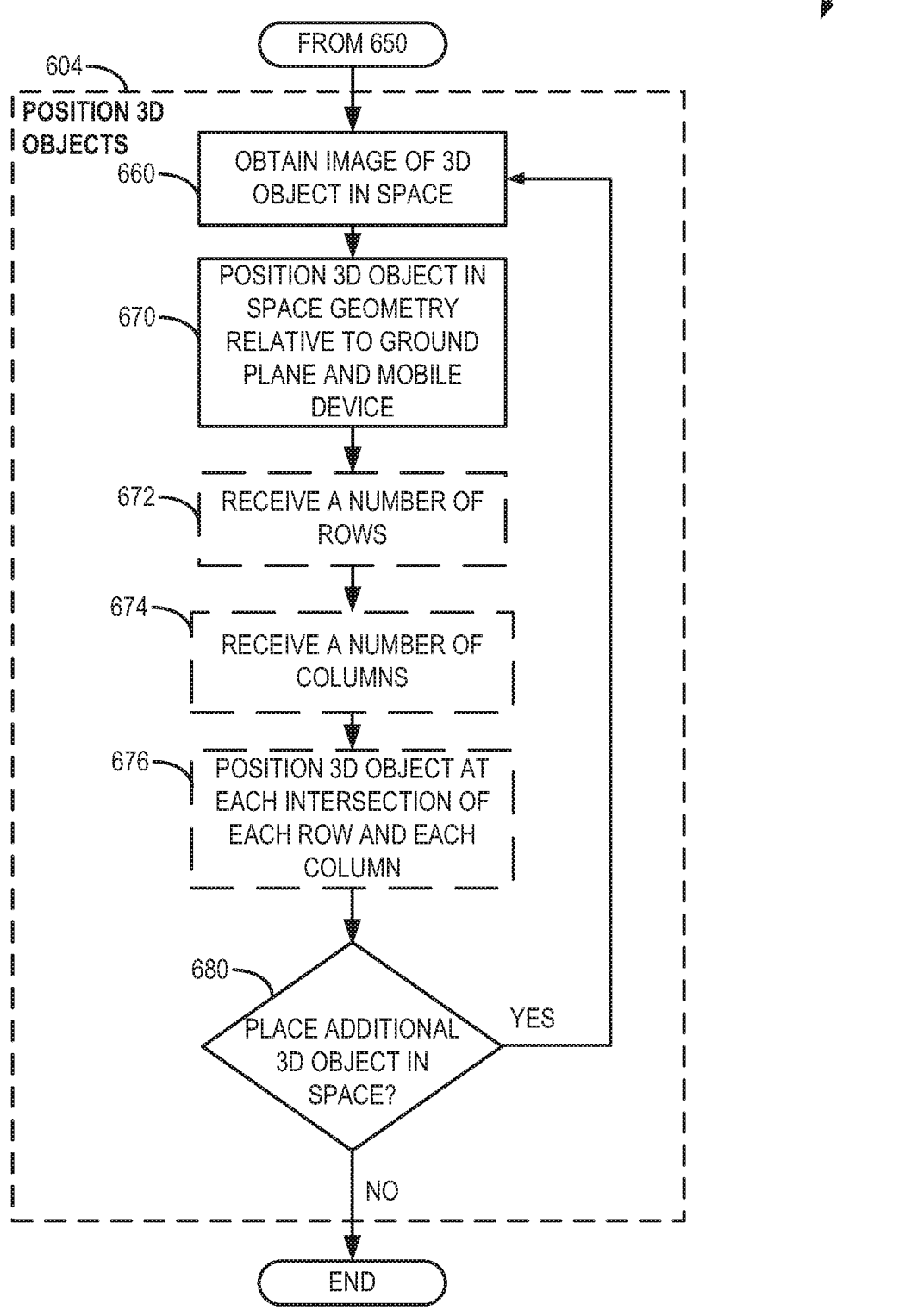

METHOD FOR PROVIDING SCALE TO ALIGN 3D OBJECTS IN 2D ENVIRONMENT

CROSS REFERENCE TO RELATED APPLICATIONS

The present application is a continuation of U.S. Non-Provisional patent application Ser. No. 14/710,554 entitled "METHOD FOR PROVIDING SCALE TO ALIGN 3D OBJECTS IN 2D ENVIRONMENT", filed on May 12, 2015. U.S. Non-Provisional patent application Ser. No. 14/710,554 is a continuation-in-part of U.S. Non-Provisional patent application Ser. No. 14/251,503 entitled "VISUALIZATION OF THREE-DIMENSIONAL MODELS OF OBJECTS IN TWO-DIMENSIONAL ENVIRONMENT", filed on Apr. 11, 2014. U.S. Non-Provisional patent application Ser. No. 14/251,503 is a continuation-in-part of U.S. Non-Provisional patent application Ser. No. 13/552,658 entitled "VISUALIZATION OF THREE-DIMENSIONAL MODELS OF OBJECTS IN TWO-DIMENSIONAL ENVIRONMENT", filed on Jul. 19, 2012. U.S. Non-Provisional patent application Ser. No. 13/552,658 claims priority to U.S. Provisional Patent Application No. 61/660,730 entitled "VISUALIZATION OF THREE-DIMENSIONAL MODELS OF OBJECTS IN TWO-DIMENSIONAL ENVIRONMENT", filed on Jun. 17, 2012. U.S. Non-Provisional patent application Ser. No. 14/710,554 also claims priority to U.S. Provisional Patent Application No. 61/992,759 entitled "METHOD FOR FORMING WALLS TO ALIGN 3D OBJECTS IN 2D ENVIRONMENT", filed on May 13, 2014. U.S. Non-Provisional patent application Ser. No. 14/710,554 also claims priority to U.S. Provisional Patent Application No. 61/992,629 entitled "METHOD FOR PROVIDING SCALE TO ALIGN 3D OBJECTS IN 2D ENVIRONMENT", filed May 13, 2014. U.S. Non-Provisional patent application Ser. No. 14/710,554 claims further priority to U.S. Provisional Patent Application No. 61/992,719 entitled "METHOD FOR PROVIDING A PROJECTION TO ALIGN 3D OBJECTS IN 2D ENVIRONMENT", filed May 13, 2014. U.S. Non-Provisional patent application Ser. No. 14/710,554 claims further priority to U.S. Provisional Patent Application No. 61/992,774 entitled "METHOD FOR MOVING AND ALIGNING 3D OBJECTS IN A PLANE WITHIN THE 2D ENVIRONMENT", filed May 13, 2014. U.S. Non-Provisional patent application Ser. No. 14/710,554 claims further priority to U.S. Provisional Patent Application No. 61/992,746 entitled "METHOD FOR REPLACING 3D OBJECTS IN 2D ENVIRONMENT", filed May 13, 2014. U.S. Non-Provisional patent application Ser. No. 14/710,554 claims further priority to U.S. Provisional Patent Application No. 61/992,665 entitled "METHOD FOR INTERACTIVE CATALOG FOR 3D OBJECTS WITHIN THE 2D ENVIRONMENT", filed May 13, 2014. The entire contents of each of the above-listed applications are hereby incorporated by reference for all purposes.

BACKGROUND AND SUMMARY

Interior design may involve developing and evaluating a design for a room or environment. For example, a designer may wish to position various objects, including furniture, lighting fixtures, and wall hangings, within a two-dimensional (2D) environment of an interior room. Conventional interior design tools may enable a user to position a three-dimensional (3D) model of an object by selecting the object, and "dragging and dropping" the object to a location in the 2D environment using a mouse, keyboard or other input device.

The inventors herein have recognized various issues with the above methods. Namely, although 3D objects may be positioned independently within the 2D environment, it may be difficult to precisely align the 3D object relative to other objects already present in the 2D environment. For example, a user may want to place a table underneath and in vertical alignment with a light fixture. Using conventional methods, a user can manually position an object to be in alignment with another object; however, manually aligning objects may be time-consuming and imprecise.

One approach that at least partially address the above issues may include a method for placing a 3D object in a 2D environment, comprising, receiving an image of a 2D environment, calculating the position for placing the 3D object in the 2D environment, receiving an image of a 3D object and positioning the 3D object in the 2D environment based on the calculated position.

Another example embodiment may include a method of placing a 3D object in a 2D environment, comprising, capturing an image of the 2D environment with a mobile device, calculating the perspective and scale based on an angle between a ground plane and a ray projected from the mobile device and positioning the object in the 2D environment based on the calculated object position.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A, 4B and 4C are example representations of the 2D environment shown in FIG. 3.

FIGS. 6A and 6B are example flowcharts for a method of placing an object in a modeled 2D environment.

DETAILED DESCRIPTION

Figure 1A:
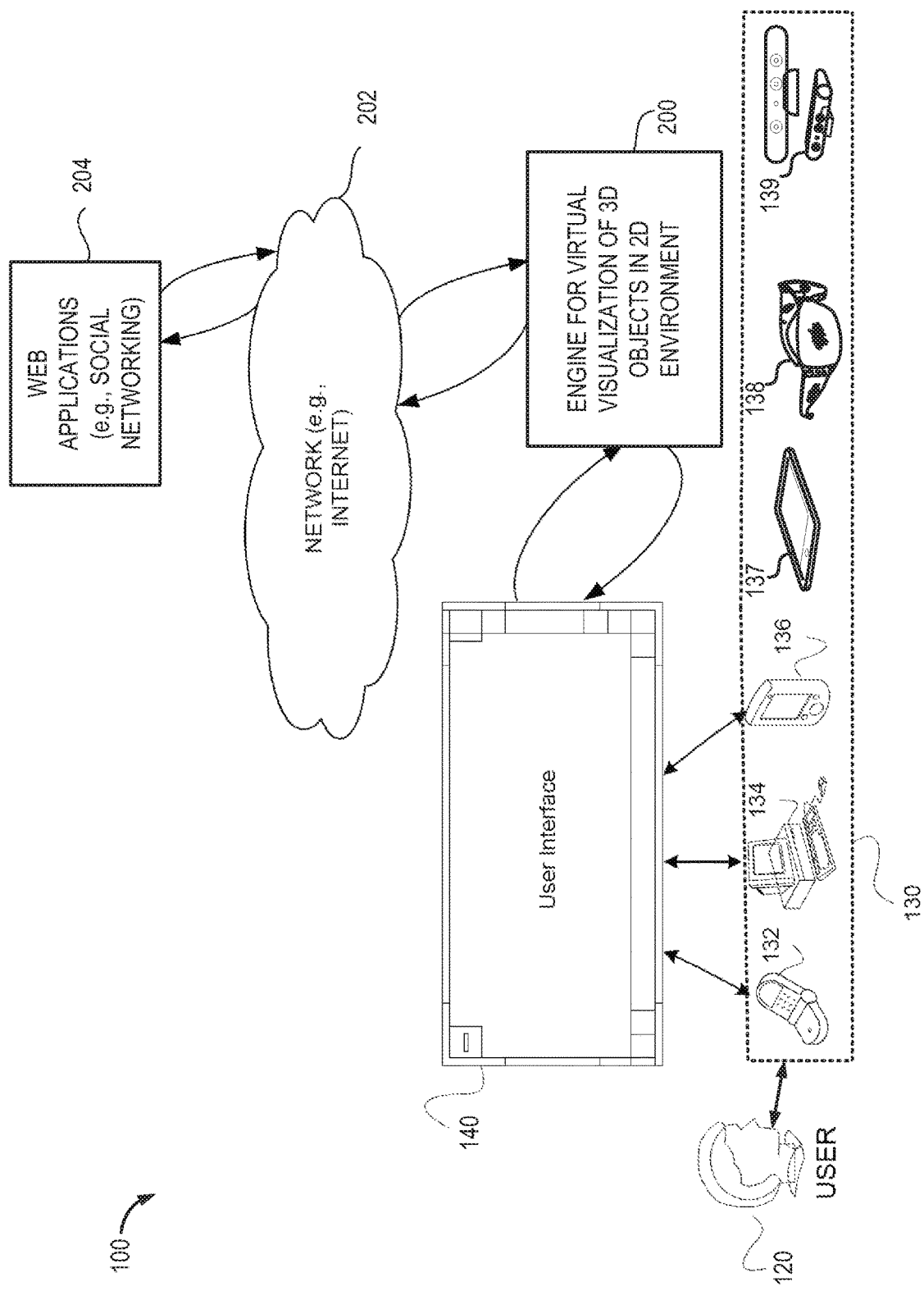
FIG. 1A is a block diagram illustrating the overall system for visualization of 3D models of objects in a 2D environment, in accordance with various embodiments.

The present description relates to visualization and adding of 3D models of objects to a 2D environment, wherein the 2D environment is a real environment represented by a photo or video. A user may import photographic images, digital images, video images, and other graphical representations of the 2D environment. Further, the 2D environment may include existing graphical materials or graphical materials captured as a still image or a live feed image. The 2D environment may serve as the background environment for adding a 3D model of an object.

The 3D object is associated with object information data which includes a defined set of parameters relevant to the 3D object. The parameters may include attributes, instructions, and other such scripts associated and essential for graphical use of the 3D object. Physical properties of the 3D object, interaction between object entities may be analyzed with such associated data. The object information data associated with the 3D object may include geometric attributes, depth value, color value, and such other properties. For example, geometric attributes of the 3D object, such as a chair, may include height and width information. If a user decides to place the chair near a table, already present in the 2D environment, the height and width information for the chair may help the user in precise aligning.

The object information data may also include metadata encoding one or more of a set of parameters relevant to the 3D object, manufacturer's guidelines, regulations and guidelines governing the 3D object, safety guidelines for the 3D object, and any other relevant information specific to the 3D object.

The object information data may include metadata defining the behavior of the 3D object within the 2D environment. For example, a 3D object may include metadata defining an object as one of a wall object, ceiling object, floor object, or combination thereof. The metadata may further define the placement and movement of the object within the environment.

The object information data may also include metadata encoding an information tag. The information tag may include a description of the 3D object including dimensions, materials, cost, manufacturer, and other information specific to the 3D object discussed below.

The object information data may also include metadata encoding graphical data, spatial data, and other rendering data for superimposing the 3D object within the 2D environment. Graphical, spatial, and rendering data may be processed by a computing device to generate and display the 3D object to the user.

The parameters may include attributes, instructions, behavior characteristics, visualizations to be displayed by the 3D object, and other such scripts associated and essential for graphical use of the 3D object. For example, the parameters may include, but are not limited to, the physical dimensions of the 3D object, mounting requirements for the 3D object, metadata identifying the 3D object as a floor object, wall object, ceiling object, or combination thereof, power requirements, length of a power cord, and any other relevant information describing the 3D object.

Additionally, the object information data may include additional parameters such as manufacturer's guidelines and/or safety guidelines for safe and proper installation and operation of the 3D object. For example, the object information data may include metadata encoding a minimum clearance or spatial requirement surrounding the 3D object. The minimum clearance/spatial requirement may be required for adequate ventilation of the 3D object, prevention of fire hazards, noise control, clearance of moving parts of the 3D object, or to satisfy any other personal safety, medical safety, or industrial safety standard. As an example, a display may require 6 inches clear from the cooling fan gratings to allow for proper airflow to cool the electric internals within the display. As another example, in a medical application, a magnetic resonance imager may generate an electro-magnetic field in an area surrounding the magnetic resonance imager that may interfere with other electrically powered or magnetically sensitive medical equipment, personal medical equipment such as a pacemaker, and any magnetic material that may be drawn to the magnetic resonance imager by magnetic attraction. In an industrial application, some industrial equipment have moving or rotating parts that may extend past the main body of the piece of industrial equipment. Therefore, to allow for proper operation of the industrial equipment, other equipment or objects may be located outside a minimum clearance or spatial requirement surrounding the piece of industrial equipment.

In another example, in a restaurant environment, the tables, chairs, and other objects within the restaurant space may be required to be arranged such that a minimum clearance surrounding each object is maintained and that pathways for traversal are maintained clear and of sufficient dimensions to meet federal and local accommodation codes. Therefore, each chair and each table may include a minimum clearance or spatial requirement surrounding the table or chair to meet the governing guidelines.

In another example, in a retail environment, retail display fixtures may be arranged within the retail space such that a minimum clearance surrounding each fixture may be maintained to allow shoppers to easily move within the retail space and to meet federal and local accommodation codes. In addition to satisfaction of the governing access codes, the 3D models of the display fixtures and accompanying merchandise may be arranged within the 2D image of the retail space allowing retail planners to efficiently design retail merchandising plans, design retail exhibit plans, and then electronically distribute the design plans to the stores. Further, the retail merchandising teams at the stores may propose amendments to the design plans that are specific to the available retail space within the store accounting for differences due to the specific architectural design of the store space. These amendments may then be reviewed and approved by the retail planners, thereby providing an advantage of an efficient and electronic means of distributing, amending, and approving retail merchandising plans.

The object information data may be provided by multiple sources, including but not limited to, one or more of the manufacturer of the 3D object, government safety regulations such as provided by the Occupational Safety and Health Administration or other Federal or local governing body, federal and local accommodation codes such as the Americans with Disabilities Act and federal, state, and local fire codes, the user may provide the object information data, object information data may be downloaded from a remote data base, encoded by an asset manager or managing service providing the 3D objects, or any other suitable means. It will be appreciated that the listed sources of object information data are not intended to be limiting.

In some embodiments, the object information data may include one or more spatial requirements. The spatial requirements may exceed the geometric dimensions of the 3D object and govern interactions between the 3D object and other object entities. The spatial requirements of a 3D object may be specific to the object based upon one or more of a manufacturer's recommendation, imported from a remote database, government regulation, configured by the user, or any other suitable source.

In some embodiments, the two-dimensional environment may also include environmental information data. The environmental information data may include metadata which may encode one or more of a set of properties relevant to the 2D environment, regulations and guidelines governing the 2D environment such as governing access regulations, industrial safety standards, and governing fire codes, safety guidelines for the 2D environment, and any other relevant information specific to the 2D environment. The properties encoded by environmental information data may include one or more of the dimensions of the 2D environment, characteristics of the 2D environment governing the behavior and movement of 3D objects within the 2D environment, locations of power supplies and the voltage and frequency supplied, construction information such as location of load bearing members, allowable load information, construction materials, available ventilation, acoustic information, fixed lighting sources, and any other information relevant to the two-dimensional environment.

The environmental information data may be provided by multiple sources such as one or more of government safety regulations such as provided by the Occupational Safety and Health Administration or other Federal or local governing body, federal and local accommodation codes such as the Americans with Disabilities Act and federal, state, and local fire codes, the user may provide the object information data, object information data may be downloaded from a remote data base, encoded by an asset manager or managing service providing the 3D objects, or any other suitable means.

In these embodiments properties of the 2D environment may be retrieved from the environmental information data and analyzed to determine interaction with 3D objects within the 2D environment. As a non-limiting example, one or more threshold barriers between two planes of the 2D environment may be adjusted to satisfy one or more conditions encoded in the metadata of both the environmental information data and the object information data.

As the data associated with the 3D object is transferred to the 2D environment, the 3D object may be visualized in the 2D environment with respect to scale and perspective of the 2D environment. The 2D environment including the 3D object may be referred to as a modeled 2D environment. Within the 2D environment, the user may move the 3D object in a vertical direction, horizontal direction, or in a rotational manner. For example, if the 3D object is a wall painting, the user may move the wall painting in a vertical or horizontal manner on a wall plane of the 2D environment; whereas, if the 3D object is a chair on a ground plane of the 2D environment, the user may move the chair in a horizontal or rotational manner.

A non-limiting example of a 3D object may be a display. The display may be any of a television, monitor, computer monitor, or visual array including, but not limited to, a liquid crystal display (LCD), light emitting diode (LED) display, organic light emitting diode (OLED) display, cathode based display, or any other display device capable of providing a visual image to a viewer. The display may be comprise any of a plurality of shapes, such as square, rectangular, curved, round, or any suitable geometric shape. Further, the display may include a support frame, may be frameless, or any other structural form factor known in the art. The display may be a stand-alone display or one of a plurality of display units comprising a composite display including multiple display units.

The scale and perspective of the 2D environment as mentioned above may be obtained by the user with the help of user devices such as cell phone and tablet PCs. Modern day mobile user devices are equipped with cameras and sensors. Modern day mobile devices such as cell phones and tablet PCs include a variety of sensors that help the user automate and calculate both linear and angular dimensions. The sensors may include accelerometers, gyroscopes, compass, and so forth. Accelerometers in mobile user devices may be configured to detect the orientation of the mobile device while the gyroscope adds information by tracking rotation of the device. While the accelerometer measures the linear acceleration of movement, the gyroscope measures the angular rotation and angular rotational velocity. Combining information from a three-axis accelerometer and a three-axis gyroscope, the user may obtain accurate linear and angular information.

The user may use the camera in the user device to project a light ray to reach the ground plane of the environment. The angle at which the light ray reaches the ground plane may be calculated with the help of the gyroscopic sensors present in the user devices. The light ray from the camera lens, the height of the user device from the ground plane and the distance between the point where the user and the user device are located to the point where the light ray reaches the ground plane, forms a virtual triangle. The user may add the user height, which in our current example is also the user device and camera lens height. Combining the information about the height of the camera lens from the ground plane and the angle at which the light ray from the camera lens reaches the ground plane, the user may be calculate the distance between the user device and the point at which the light ray reaches the ground plane. The user may use the distance calculated to place a 3D object in the 2D environment. Additionally, if the 3D object position thus obtained is not satisfactory for the user, the user may use the camera lens of the user device to project another ray to another point on the ground plane, and so forth.

The user may save the resulting image to a personal computer (PC) or network database for future use or reference, or post the resulting image on a social network, and perform other operations on the image. Further, the user may have some previously saved images which the user may use to compare with the newly obtained images in order to select preferable combinations of a 3D object in a 2D background. The user may use his preferences before purchasing one or more 3D object for the 2D environment.

Additionally, the user may be connected to various social networking services and/or microblogs, such as Facebook™, Twitter™, and other such networking services. Connection to social networking services and/or microblogs may allow user to interact with his contacts to share and obtain opinion and feedback on image obtained after placing 3D objects in 2D environment. Further, the user may also request help from designing services to arrange 3D objects within a given 2D environment.

Visualization and addition of 3D objects to any 2D environment provides ample opportunities in various spheres of human life. Spatial representation of 3D objects may help in comprehending and learning, designing and drafting, efficient space management, and accelerated decision making and planning. The ability to represent virtual 3D objects in a real environment can provide further applications, such as selecting furniture for a house, designing kitchen cabinets, selecting display and presentation equipment for conference rooms, presentation layouts for tradeshow booths, industrial planning and industrial equipment placement, medical equipment placement, and other space and design applications.

Figure 1B:
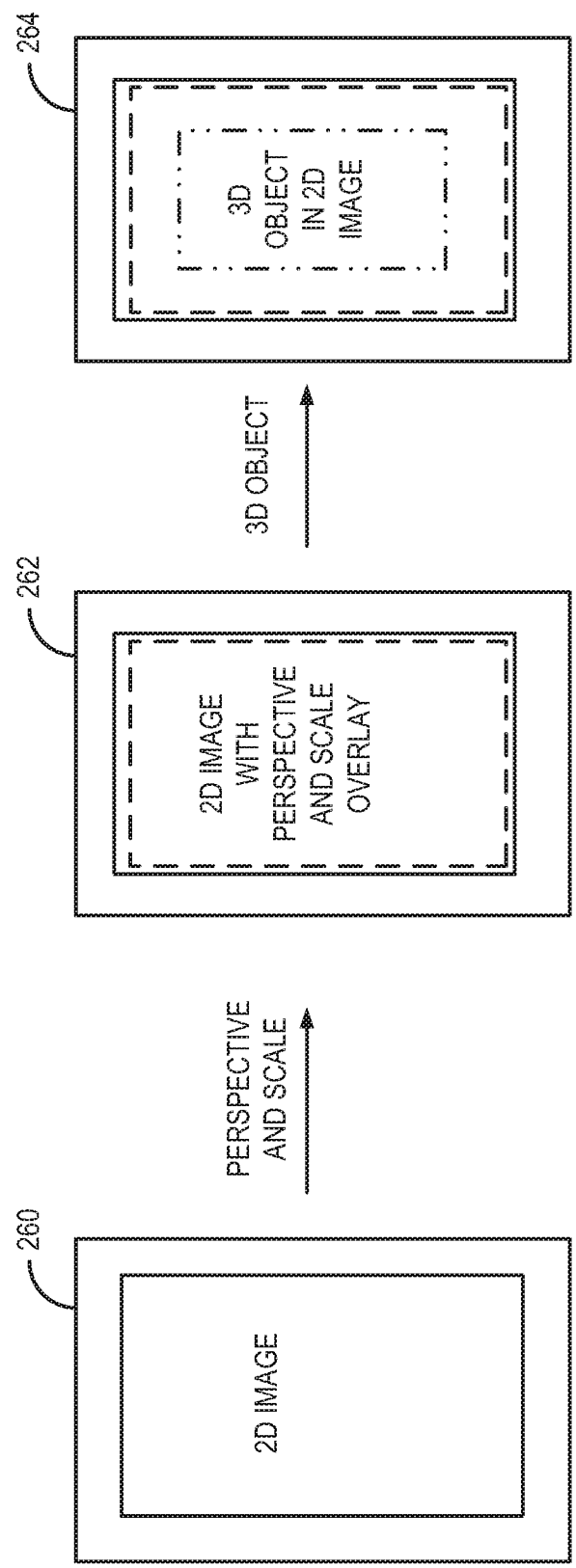
FIG. 1B is a schematic illustration of a system for visualization of 3D model of objects in a 2D environment.
Figure 2:
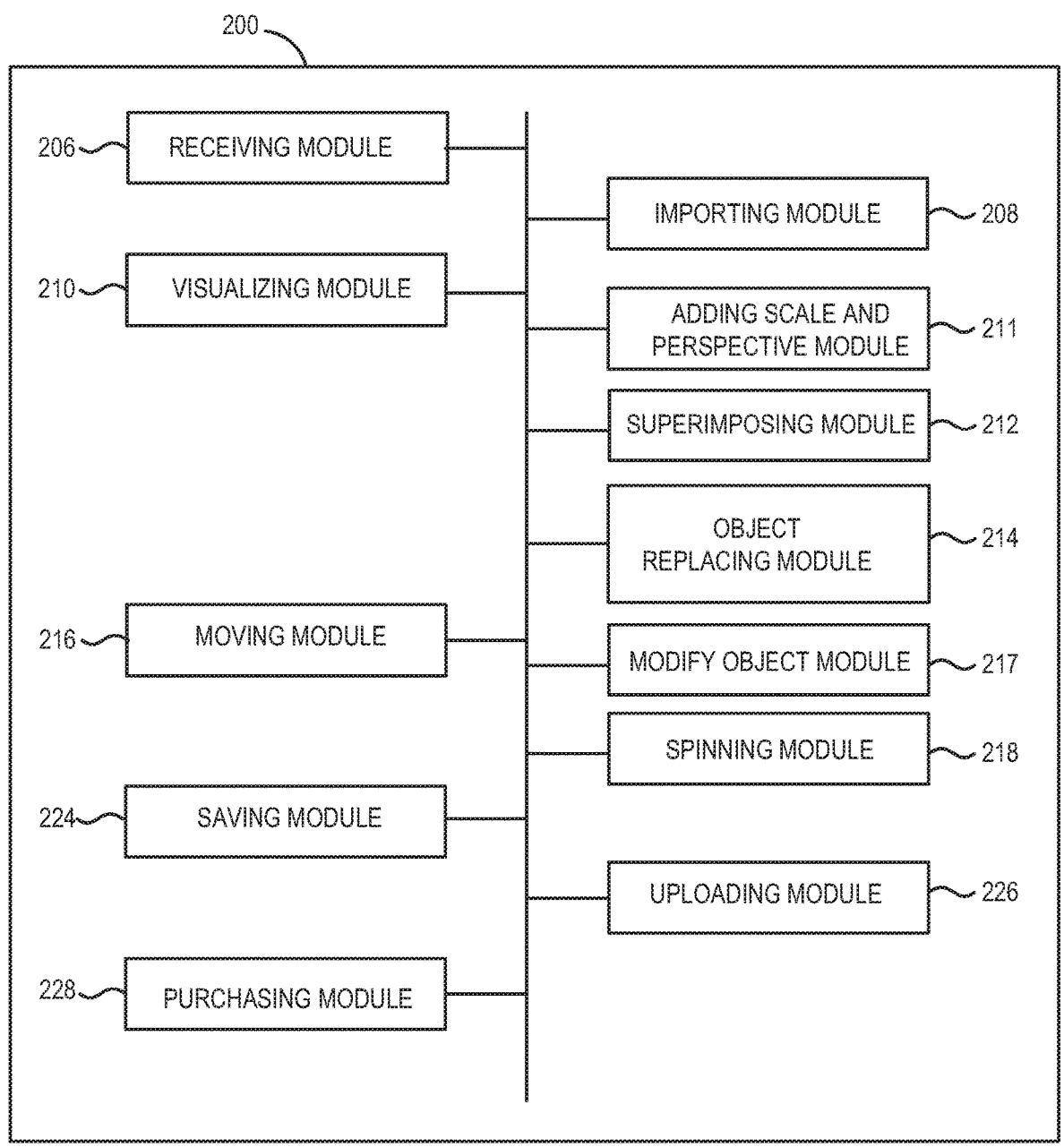
FIG. 2 is a block diagram showing various modules of an engine for visualization of 3D models of objects in a 2D environment, in accordance with various embodiments.
Figure 3A:
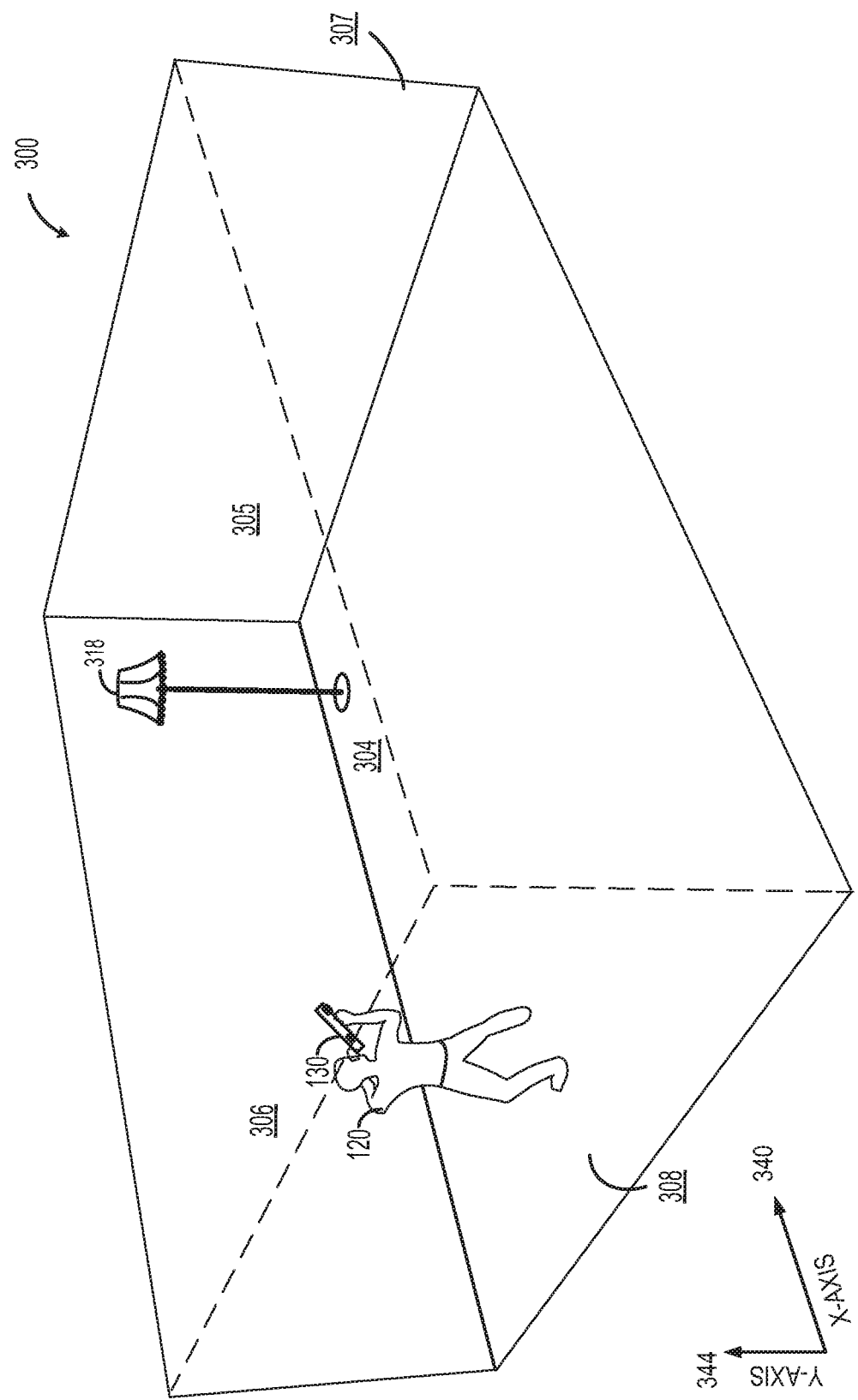
FIGS. 3A and 3B are example representations of the 2D environment with a user and a user device.
Figure 3B:
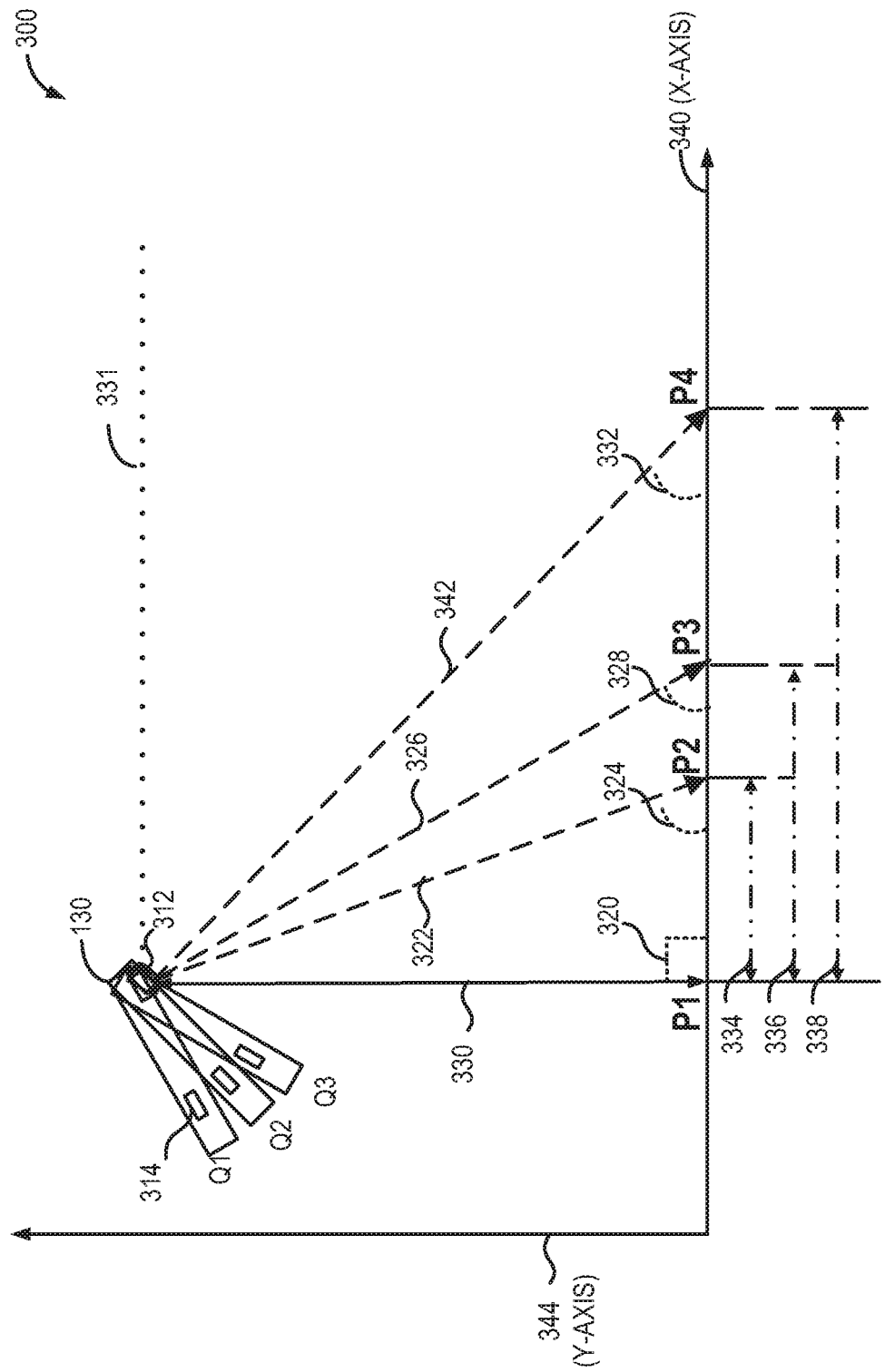
Figure 4A:
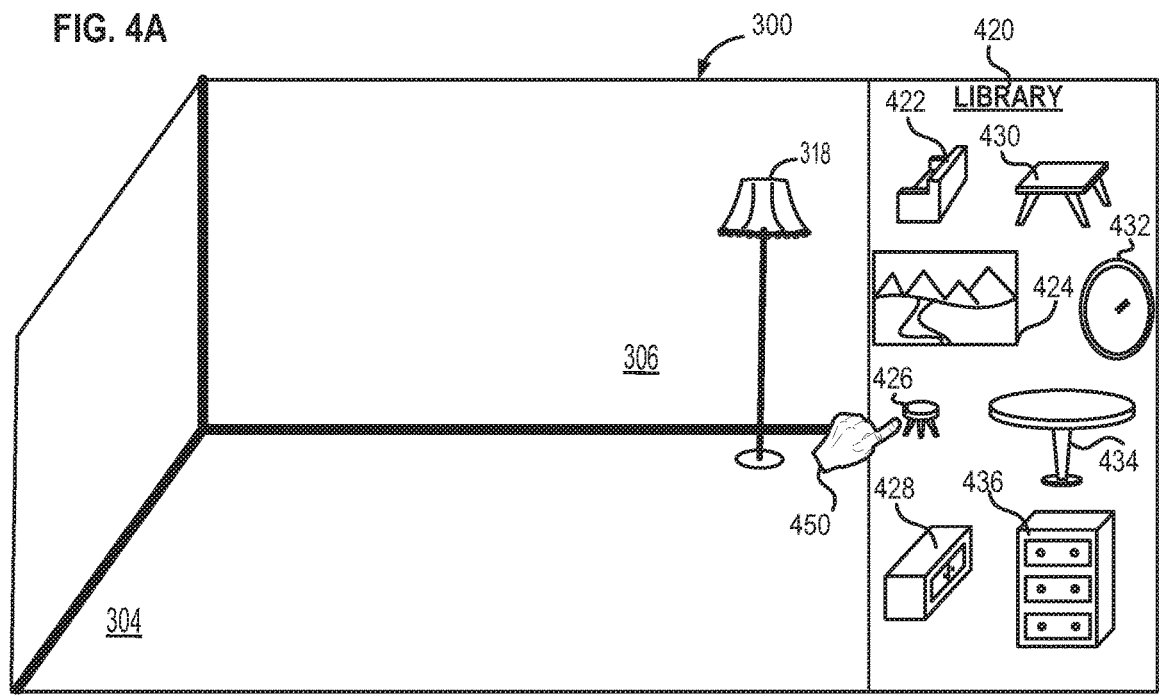
Figure 4B:
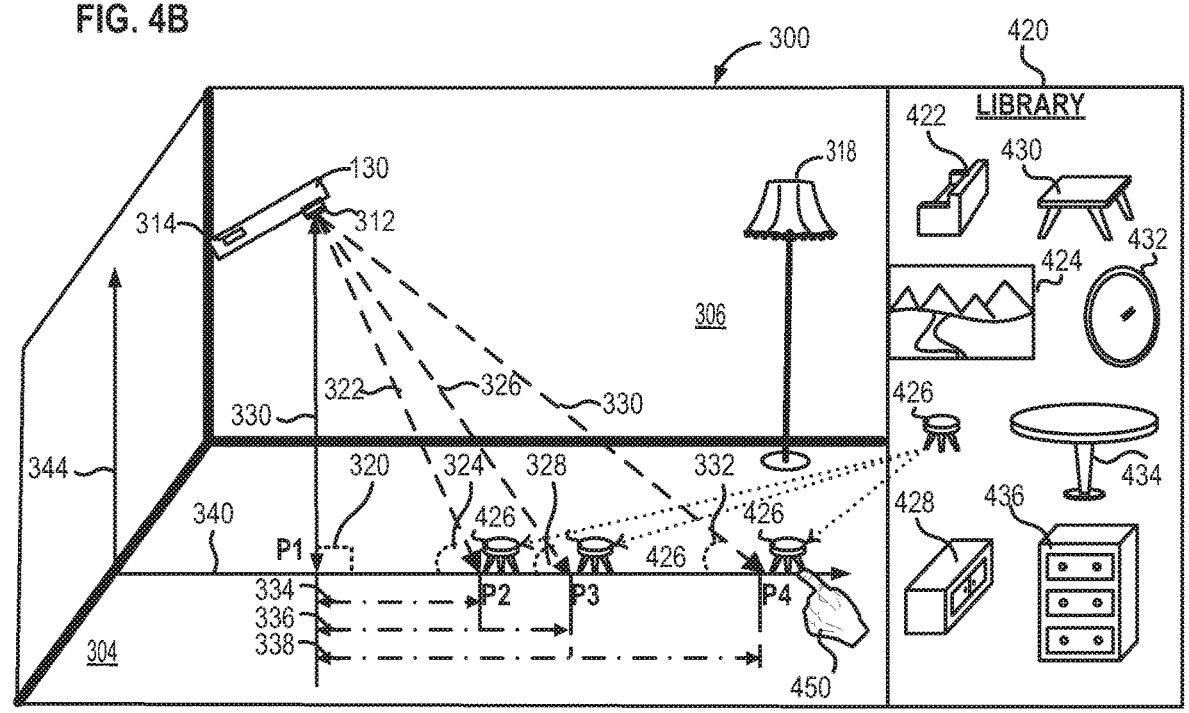
Figure 5A:
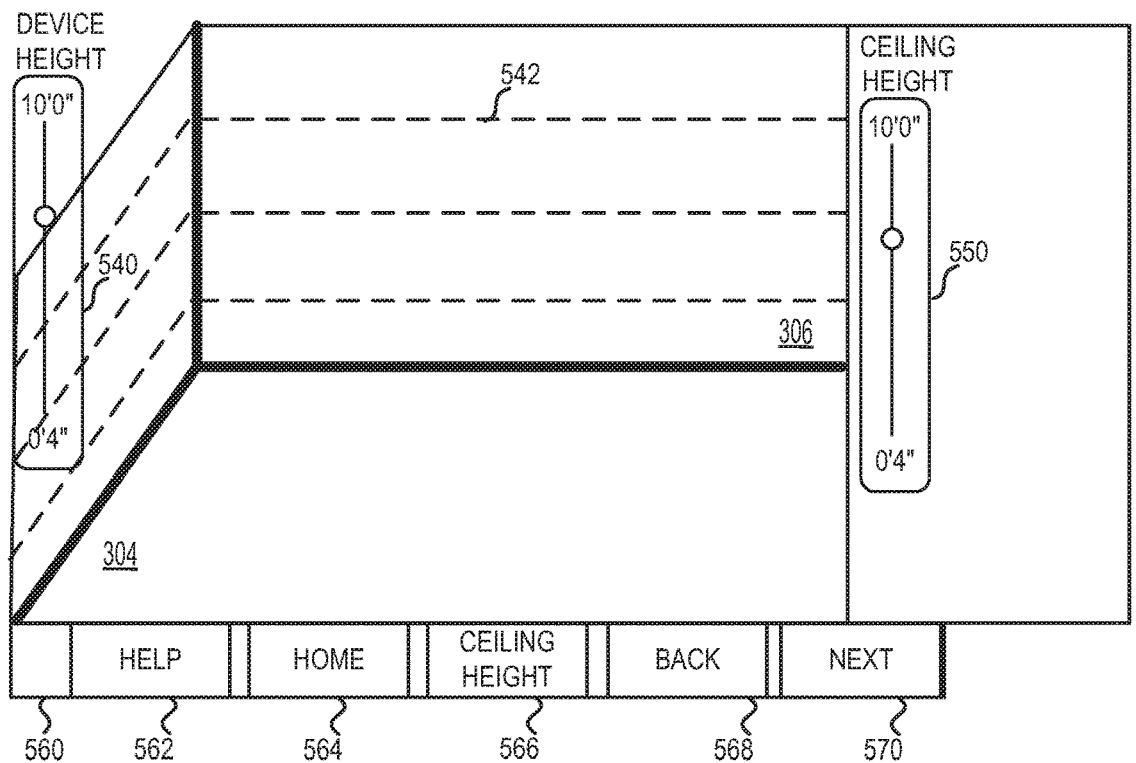
FIGS. 5A, 5B, 5C, 5D, 5E, and 5F are example representations of placing a 3D object within the 2D environment shown in FIG. 3.
Figure 5B:
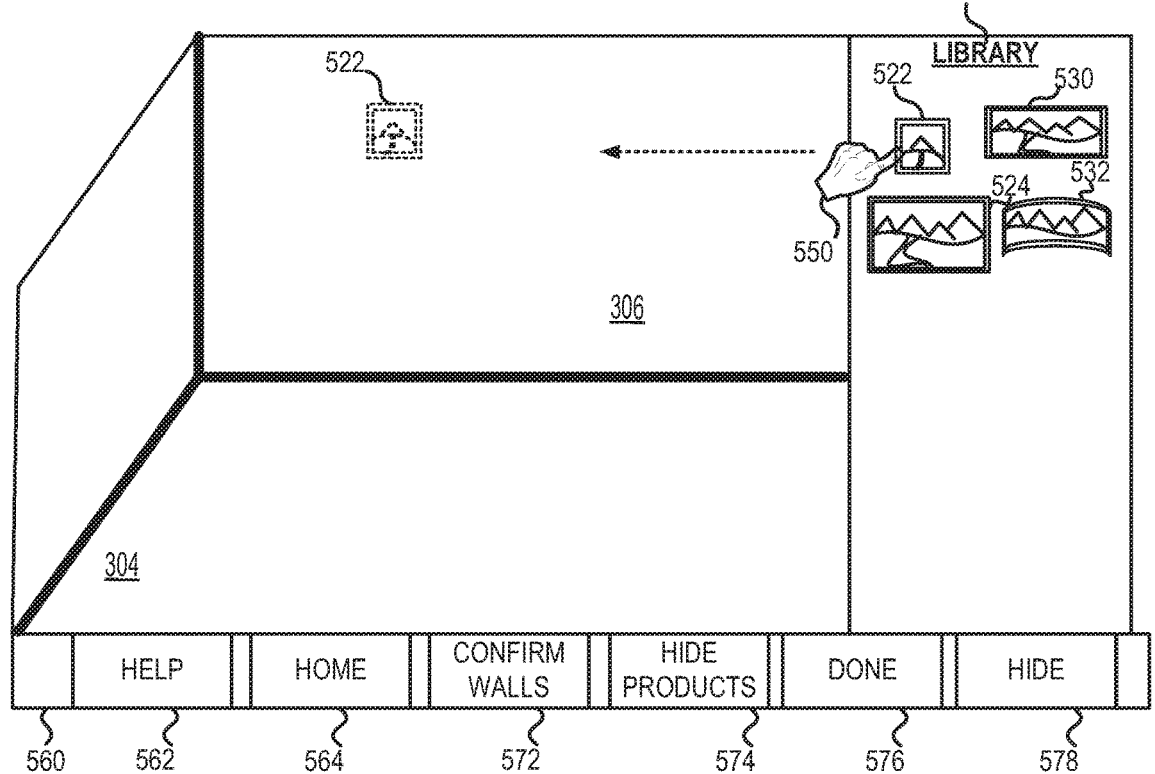
Figure 5C:
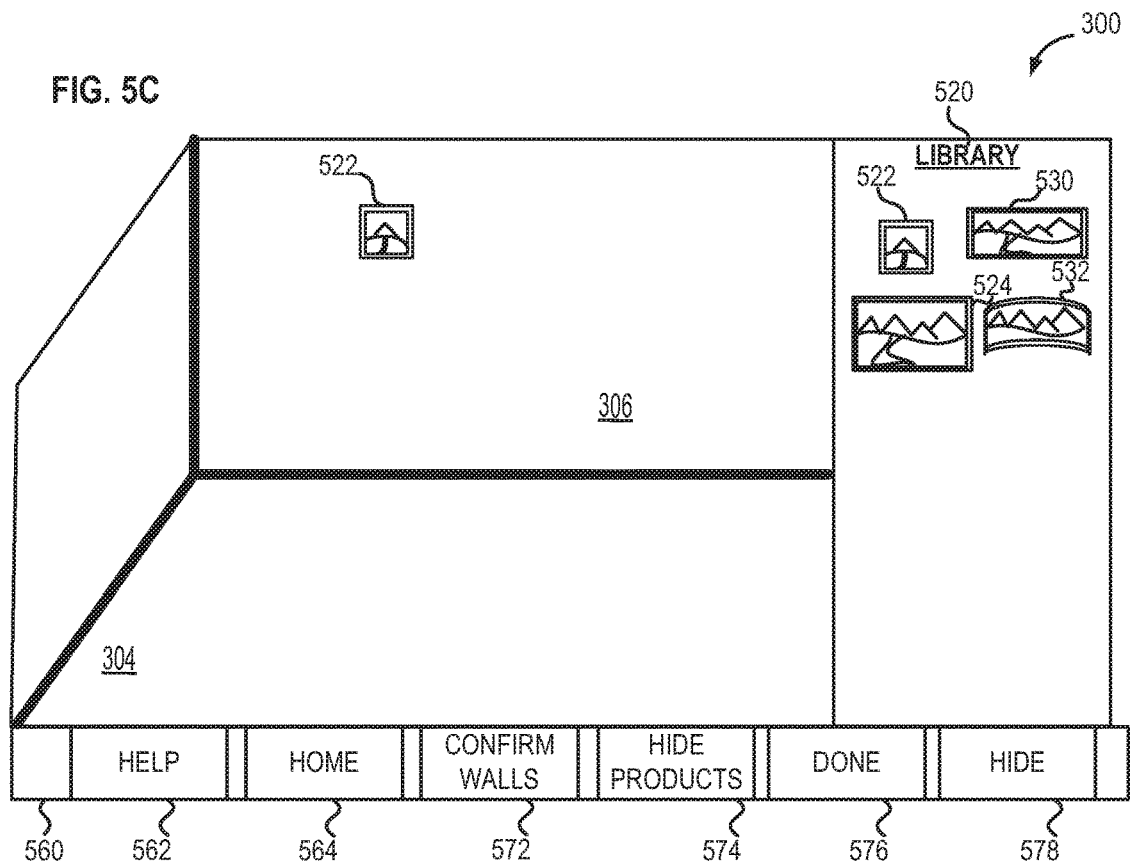
Figure 6A:
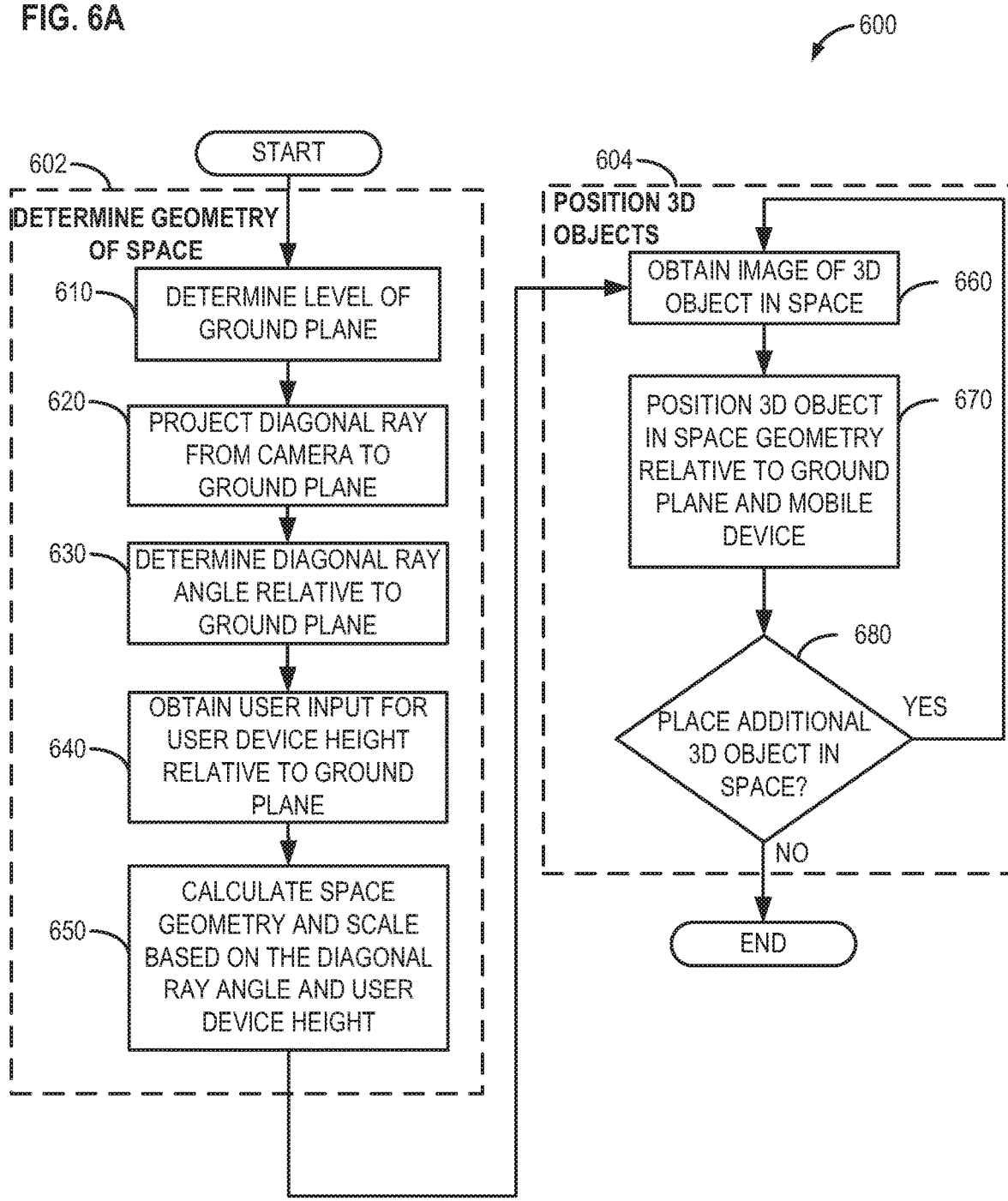
Figure 7:
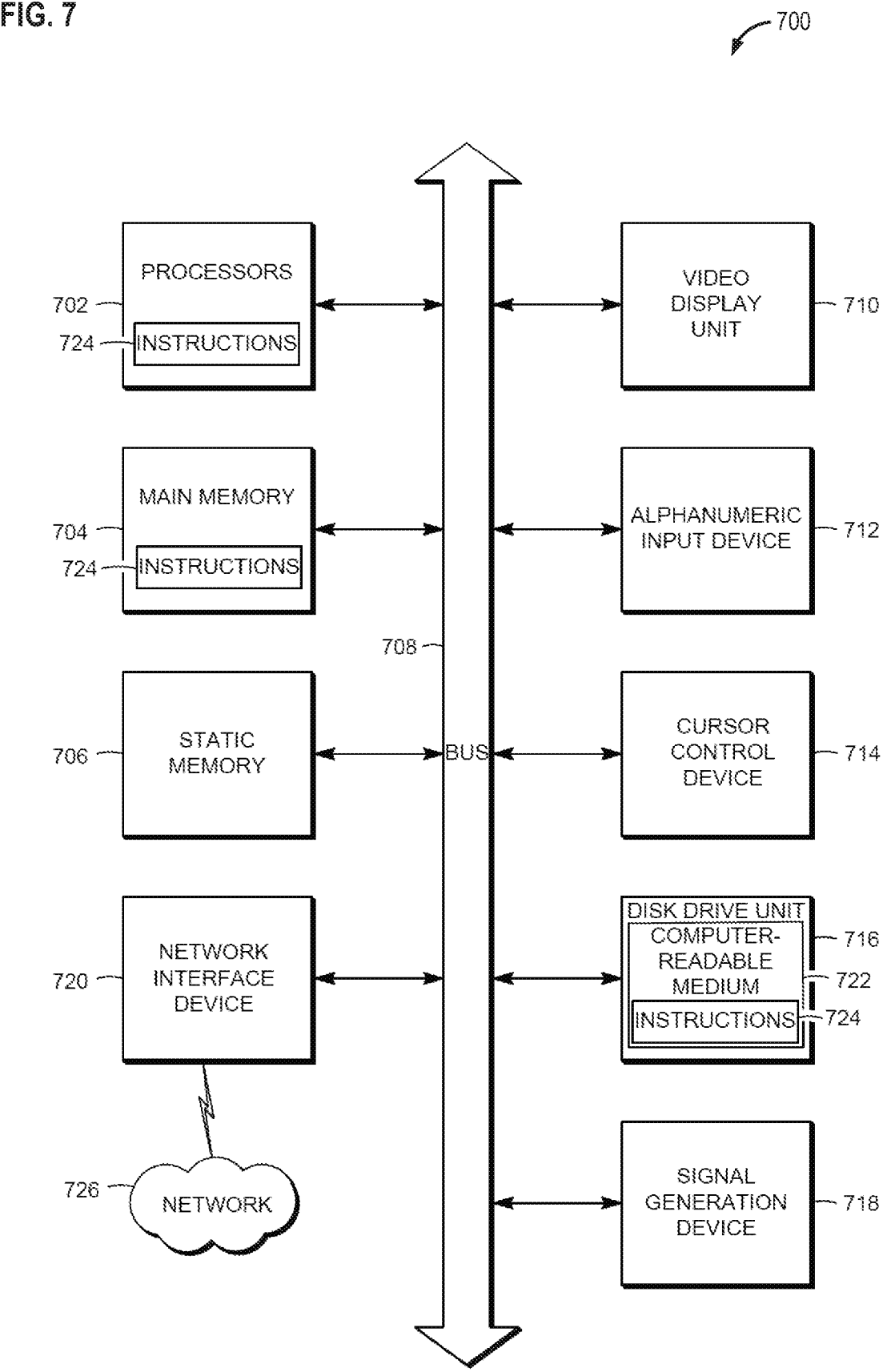
FIG. 7 illustrates an example of a computer network system, in which various embodiments may be implemented.

FIG. 1A is a block diagram illustrating the overall system for visualization of 3D models of objects in a 2D environment, in accordance with various embodiments of the present application. FIG. 1B is a schematic illustration of a system for visualization of 3D models of objects in a 2D environment. FIG. 2 is a block diagram showing various modules of an engine for visualization of 3D models of objects in the 2D environment. FIGS. 3A and 3B are example representations of the 2D environment, including a user and a user device. FIGS. 4A, 4B and 4C are further example representations of the 2D environment shown in FIG. 3. FIGS. 5A, 5B and 5C are example representations of placing a 3D object within the 2D environment shown in FIG. 3. FIGS. 6A and 6B are example flowcharts for a method of placing an object in the 2D environment. FIG. 7 illustrates an example of a computer network system, in which various embodiments may be implemented.

FIG. 1A illustrates a block diagram of an overall system 100 for visualization of 3D objects in a 2D environment, in accordance with various embodiments of the present disclosure. Overall system 100 may include a user 120, user devices 130, a user interface 140, an engine 200 for virtual visualization of 3D models of objects in 2D environment, a network 202, and various web applications 204. The user devices 130 may include a mobile phone 132, a personal computer (PC) 134, a personal digital assistant (PDA) 136, a tablet PC 137, a wearable computer device 138 such as Google Glass™ and Recon Jet™, a 3D scanner 139 and the like. The user 120 via user devices 130 interacts with the user interface 140. The user may also directly interact with the user interface via touchscreen, keyboard, mouse key, touch pad and the like. The engine 200 for visualization of 3D objects in 2D environment may comprise of local device-based, network-based, or web-based service available on any of the user devices 130. The user may further interact with the web applications 204. The web applications may include social networking services.

The user 120 may interact with the user interface 140 via the user devices 130. The system for virtual visualization of 3D models of objects in 2D environment 300 may be implemented on a local device or via a network-based or web-based service accessible via user devices 130. The user 120 may periodically interact with the system for virtual visualization of 3D models of objects in 2D environment 300 via the user interface 140 displayed using one of the user devices 130. Additionally, the user 120 may periodically interact with the web application 204 such as a social networking service (including social networks, microblogs, web blogs, and other web resources) via the system for virtual visualization of 3D models of objects in 2D environment 300 and the network 110 to upload graphics obtained using the system for virtual visualization of 3D models of objects in 2D environment 300, communicate with members of the social networking service, or request help from design services, or purchase a 3D object through web applications 204.

The user devices 130, in some example embodiments, may include a Graphical User Interface (GUI) for displaying the user interface 140. In a typical GUI, instead of offering text menus or requiring typed commands, the engine 200 may present graphical icons, visual indicators, or graphical elements called widgets that may be utilized to allow the user 120 to interact with the user interface 140. The user devices 130 may be configured to utilize icons in conjunction with text, labels, or text navigation to fully represent the information and actions available to users.

The network 202 may include the Internet or any other network capable of communicating data between devices. Suitable networks may include or interface with one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), an Advanced Intelligent Network (AIN) connection, a synchronous optical network (SONET) connection, Digital Subscriber Line (DSL) connection, an Ethernet connection, an Integrated Services Digital Network (ISDN) line, a cable modem, an Asynchronous Transfer Mode (ATM) connection, or an Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), Cellular Digital Packet Data (CDPD), Research in Motion (RIM), limited duplex paging network, bluetooth radio, or an IEEE 802.11-based radio frequency network. The network 202 may further include or interface with any one or more of an RS-232 serial connection, an IEEE-1394 (Firewire) connection, a Fiber Channel connection, an IrDA (infrared) port, a Small Computer Systems Interface (SCSI) connection, a Universal Serial Bus (USB) connection or other wired or wireless, digital or analog interface or connection, mesh. The network 202 may be a network of data processing nodes that are interconnected for the purpose of data communication.

FIG. 1B is a schematic illustration of a system for visualization of 3D models of objects in a 2D environment. Specifically, as shown and described in more detail herein, a 2D environment may be provided including a 2D image 260. The 2D image 260 may be a photograph, line drawing or video. For example, the 2D image 260 may be a picture of a room or part of a room. The 2D image 260 may be a personalized image captured by a user's hand-held device or other computing device. In other examples, the 2D image 260 may be saved or imported from a storage device on a remote server or other device.

Perspective and scale may be added to the 2D image 260. The perspective and scale may be saved as part of the image such that the 2D image is now a combined image 262 having both the 2D information and perspective and scale information associated with the 2D image.

In some examples and as described in more detail herein, walls may be selectively positioned within the image. Further, in some examples, a 3D object may then be positioned within the 2D image with perspective and scale overlay, combined image 262. The 3D object may be realistically positioned within the resulting image 264 based on the perspective and scale overlay information. Further, the 3D object may be positioned within resulting image 264 such that the 3D object may be perceived in three dimensions within the 2D environment.

FIG. 2 illustrates a block diagram for the engine for virtual visualization of 3D models of objects in 2D environment 300. The engine for virtual visualization of 3D models of objects in 2D environment 300 may include a receiving module 206, an importing module 208, a visualizing module 210, an adding scale and perspective module 211, a superimposing module 212, an object replacing module 214, a moving module 216, a modify object module 217, a spinning module 218, a saving module 224, an uploading module 226 and a purchasing module 228.

Although various modules of the engine for visualization of 3D models of objects in 2D environment 300 are shown together, the engine for visualization of 3D models of objects in 2D environment 300 may be implemented as a web service, via a distributed architecture, or within a cloud computing environment. The files created with this application may contain perspective, scale and 3D model information in addition to the 2D graphic background information. The files may be shared, or sent to, or opened on any user devices which may be configured to display these files.

The receiving module 206 may be configured to receive inputs from the user 120 regarding an import request. The import requests may include user-specified data regarding a 2D environment, such that the 2D environment may be used as a background environment for displaying one or more 3D models of objects. The importing module 208 may be configured to import the 2D environment. The 2D environment may be a 2D photograph of an interior space such as a living room, or a bedroom, or a kitchen space, or a bathroom, or a garage, or an office space, and so forth. Additionally, the 2D environment may be a live video feed.

The visualizing module 210 may help the user 120 to visualize the imported 2D environment. The visualizing module 210 may be configured to receive a superimposing request from the user 120. The superimposing request may include receiving object information data related to a 3D object.

In addition, the visualizing module 210 may be further configured to receive a request for object replacement from the user. The object replacement request may include object information data or metadata encoding object information data including dimensions, or color, or material type of the 3D object selected from the library of 3D objects. The received object replacement request is passed to the object replacing module 214, which changes the object, based on the request. Additionally, the selected 3D object may be replaced by the user 120 with another 3D object. For example, the user may replace a large chair with a small chair in a 2D environment after visualizing both the large chair and the small chair in the 2D environment.

The visualizing module 210 may further help the user 120 to alter view settings such as brightness or contrast of the imported 2D environment. Altering the brightness or contrast of the 2D environment may allow the user to visualize the positioning of the 3D object in the 2D environment under more light or less light situations. For example, the user may be able to visualize and appreciate how the 3D object superimposed on the 2D environment may look during day time versus night time conditions, or conditions of bright lighting or dim lighting where a lamp or light fixture is being used. Additionally, the visualizing module 210 may also help the user with directional options, such as a compass or a north facing arrow to identify the orientation of the 2D environment. The user may prefer to have directional options for personal reasons, or aesthetic preference, or for daylight requirements.

The visualizing module 210 may be further configured to receive scale data (defining the scale of the 2D environment) and the perspective data (defining the perspective of the 2D environment) request from the user. The scale data and perspective data request is passed on to the adding scale and perspective module 211, which allows the user to adjust the scale and perspective of the 2D environment from a first display characteristic including one or more of a first scale and a first perspective to a second display characteristic including one or more of a second scale and a second perspective.

The method then moves on to the moving module 216. The moving module 216 may be configured to receive an object spinning request for rotational movement of the 3D object imported on to the 2D environment. The spinning request thus received is passed on to the spinning module 218, which allows spinning or any such rotational movement of the 3D object in the 2D environment. The object spinning request may include a request to spin the 3D object about an axis of rotation of the 3D object from a first rotational orientation to a second rotational orientation. For example, the 3D object inserted onto the 2D environment might be a chair or triangular table, and the user may prefer to precisely orient the chair seat in a particular direction or in case of the triangular table, the user may prefer to have the three corners of the table orient in a certain preferred directions.

As the user finalizes the appropriate color, material, positioning and spinning of the selected 3D object within the 2D environment, the resulting image may be uploaded to a social network website, microblogging service, blog or any other website resources by the uploading module 226. Thereby, the user 120 may receive inputs from contacts such as family members or friends regarding the resulting image formed by the 3D object placement in the 2D environment. With appropriate inputs, the user 120 may choose to alter the resulting image of the 3D object in the 2D environment. In addition, based on user request, the saving module 224 may save the resulting image for future use or reference. Alternatively, the user 120 may be highly satisfied with the overall look of the 3D object in the 2D environment and decide to purchase the 3D object. In such a situation the purchasing request is passed to the purchasing module, 228. In some embodiments, a contact of the user 120 via social networking websites in the web application 204, may request the user to purchase the 3D object in consideration.

FIG. 3A illustrates an example 2D room environment 300. The example 2D environment 300 may include an interior space bounded by a ground plane (e.g., a flooring surface) 304, walls 305, 306, 307 and 308, and include a floor lamp 318. The example 2D environment may include a user 120 and a user device 130. The user device 130 as shown in FIGS. 3A and 3B may be any of the user devices discussed in FIG. 1, such as a tablet PC, a cell phone, and so forth. The user 120 may use the user device 130 to obtain scale and perspective data for placing 3D objects in the 2D environment 300, as further described below. An X-axis line and a Y-axis line shown in FIG. 3A represents X-axis 340 and Y-axis 344 respectively.

Turning to now to FIG. 3B. The user device 130 may include a camera lens 312 and sensors 314. Sensors 314 may include sensors such as a gyroscope, or an accelerometer, or a compass and such others. Modern day mobile devices such as cell phones and tablet PCs include a variety of sensors that automate and the user to calculate both linear and angular dimensions. The sensors 314 may include accelerometers configured to detect the orientation of the mobile device. The accelerometers may be further configured to measure the linear acceleration of movement.

Additionally, the sensors 314 may include gyroscopes configured to add information by tracking rotation of the mobile device, user device 130. The gyroscopes may be further configured to measure angular rotation, velocity of angular rotation, lateral orientation and tilt of device. Combining information from accelerometers and gyroscopes, the user 120 may obtain accurate linear and angular information.

As illustrated in FIG. 3B, a position Q1 marks the location of the user device 130. As the user device 130 is held at the position Q1, a straight line may be extended from the level 331 of the camera lens 312 to the X-axis 340 on the ground plane 304 forming a right angle 320, marked by a point P1, representing a height 330 of the user device relative to the ground plane. The line may include the height 330 of the camera lens 312 from the X-axis 340. The height 330 of the camera lens from the X-axis 340 may be the same as the height of the user 120 from the ground plane 304. A light ray line 322 may be projected from the camera lens 312 to reach the X-axis 340 at a point P2, on the X-axis 340. A distance 334 comprise of the distance between the point P1 and the point P2 on the X-axis 340. The light ray line 322 from the camera lens 312 may be oriented to be perpendicular to the user device 130. An angle 324 may be formed by the light ray line 322 from the camera lens 312 and the X-axis 340.

The point P2 formed by the light ray line 322 indicates the position along X-axis 340, where the user 120 may place a 3D object. For the user to calculate the distance 334, the user may need to know the value of the angle 324. The sensors 314 in the user device 130 may be configured to calculate the angle 324.

As known in the art, for a right angle triangle, H=hypotenuse, O=opposite side (opposite with respect to angle χ) and A=adjacent side or base (adjacent with respect to angle χ); angle χ may be calculated as follows:

$$\tan \chi = \text{length of the opposite side } (O)/\text{length of the base or adjacent side } (A)$$

In the example illustrated in FIG. 3B:

For χ=324; tan 324=height 330/distance 334.

Herein, the distance is the height 330 of the user device 130 from the ground plane 304. As seen in FIG. 3A, the height of the device may be the same as the height of the user 120. The user 120 may therefore provide the value of height 330 to the user device 130. With the angle 324 calculated with the aid of the gyroscope sensors in the mobile device 310, and the height 330 provided by the user, the distance 334 may be calculated. The distance 334 calculated may help the user 120 to place the 3D object accurately with respect to the scale and perspective of the room.

Additionally, as illustrated in FIG. 3B, the user 120 may move the user device 130 from the position Q1 to a position Q2 and then to a position Q3. As the user 120 moves the user device 130, the light ray line 322 projected from the camera lens 312 may be deflected from reaching the X-axis at the point P2 to a point P3. A new light ray line 326 may be configured to represent the distance of the camera lens 312 from the point P3 on the X-axis 340. A distance 336 may comprise of the distance between the point P1 and the point P3 on the X-axis 340. An angle 328 may be formed between the light ray line 326 and the distance 336 on the X-axis 340 at the point P3.

Further, the user 120 may move the user device 130 to the position Q3, such that the light ray line 322 projected from the camera lens 312 may be deflected from reaching the X-axis at the point P2 to a point P4. A new light ray line 342 may be configured to represent the distance of the camera lens 312 from the point P4 on the X-axis 340. A distance 338 may comprise of the distance between the point P1 and the point P4 on the X-axis 340. An angle 332 may be formed between the light ray line 342 and the distance 338 on the X-axis 340 at the point P4.

As discussed above, for tan χ=length of the opposite side (O)/length of the base or adjacent side (A):

For χ=328; tan 328=height 330/distance 336
For χ=332; tan 324=height 330/distance 338

Therefore by adding the value for the height 330 of the user device 130 from the ground plane 304 and calculating the value for the angle at which the ray from the camera lens 312 strikes the X-axis 340, various position coordinates for placing 3D objects in the 2D environment 300 may be configured.

Turning now to FIGS. 4A, 4B and 4C. FIGS. 4A, 4B and 4C illustrate the 2D environment 300 including a floor lamp 318 and further include a library 420. The library 420 may include a couch 422, a wall painting 424, a step stool 426, a table 430, a small drawer 428, a chest of drawers 436, a center table 434 and a wall mirror 432. The library 420 may include but not restricted to the items illustrated. Additionally, when the 3D object is selected, a menu bar may be displayed indicating if the object selected is a floor object, a wall object or a ceiling object. A finger icon 450 or other suitable indicator may be used to select the 3D objects from the library 420 and superimpose onto the 2D environment 300. For example, as shown in FIG. 4A, the user 120 may select the step stool 426 from the library 420 to be placed in the 2D environment 300. With the help of the user device 130, the user may decide to position the step stool 426.

As shown in FIG. 4B, the user may have the option of positioning the step stool 426 at the point P2, or the point P3 or the point P4, along the X-axis 340 on the ground plane 304. The distance 334, the distance 336 and the distance 338, are various distance options from the location of the user device 130 at the point P1, for placing the step stool 426 on the ground plane 304 in the 2D environment 300. As shown in FIG. 4B, the finger icon 450 or other suitable indicator identifies position P4 as the user's choice to position the step stool 426 in the 2D environment 300.

FIG. 4C illustrates the final image of the 2D environment with the 3D object superimposed at point P4. The positioning of the step stool 426 is based on the preference of the user 120 with the help of the user device 130 to determine the scale and perspective of the 2D environment 300.

FIGS. 5A, 5B, 5C, 5D, 5E and 5F illustrate another embodiment for adding 3D objects to the 2D environment 300. Beginning at FIG. 5A, a user may provide perspective and scale to 2D environment 300. The user may input a device height using device height slider 540 and a ceiling height using ceiling height slider 550. Gridlines 542 may be added by the user or generated automatically. Gridlines 542 may indicate that perspective and scale data have been added to 2D environment 300. Further, a menu 560 may be presented including one or more virtual button icons. The one or more virtual button icons may include, but are not limited to, a help virtual button icon 562 configured to direct the user to a help menu of the application, a home virtual button icon 564 configured to direct the user to an application home screen, a ceiling height virtual button icon 566 configured to display ceiling height slider 550, a back virtual button icon 568 configured to direct the user to the previous action, application screen, or application function, and a next virtual button icon 570 configured to direct the user to the next application screen or function. It will be appreciated that the list of virtual button icons and their respective function are provided as an illustrative example and are not limiting.

FIGS. 5B through 5F may include a library 520. The library 520 may include a square display 522, an LED display 524, a rectangular display 530, and curved display 532. As described above, the library 520 may include but may not be restricted to the items illustrated. The 3D object may be an LED display, plasma display, a chair, a lamp, a desk, a couch, or any other suitable 3D object. Turning to FIG. 5A, a finger icon 550 or other suitable indicator may be used to select square display 522 from the library 520 and position square display 522 within the 2D environment 300.

Finger icon 550 or other suitable indicator may be used to position square display 522 on wall 306. Further, menu 560 may present the user with a different selection of virtual button icons. In FIG. 5B, menu 560 includes help virtual icon button 562, home virtual icon button 564, a confirm walls virtual icon button 572 configured to enable the user to provide an input to confirm the location and spatial orientation of one or more walls within 2D environment 300 such as wall 306, a hide products virtual button icon configured to hide 3D objects superimposed onto 2D environment 300 and/or 3D objects within library 520, a done virtual button icon 576 configured to end the current application process, such as once the user has positioned square display 522 within 2D environment 300, the user may press done virtual button icon 576 to superimpose square display 522 onto 2D environment 300, and hide virtual button icon 578 configured to hide one or more of the 3D objects, library 520, menu 560, and/or indications of perspective and scale data added to the 2D environment. FIG. 5C illustrates square display 522 superimposed upon 2D environment 300.

Figure 5D:
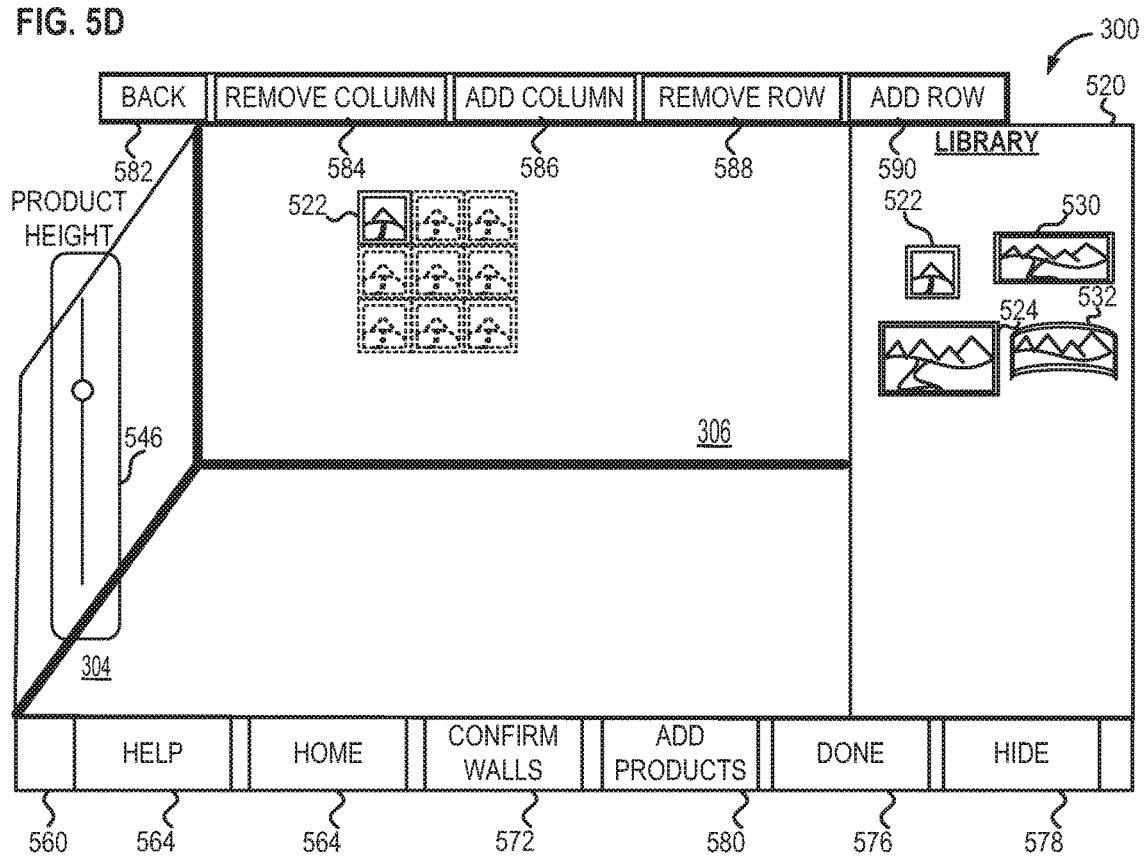

Turning now to FIG. 5D, the user may define a three-dimensional placement grid by adding one or more rows using add row virtual button icon 590 and adding one or more columns using add column virtual button icon 586. The user may also remove one or more rows using remove row virtual button icon 588 and/or remove one or more columns using remove column virtual button icon 584. The user may also go back to an immediately preceding action, function, or application menu using back virtual button icon 582.

As shown in FIG. 5D, visualizing module 210 may be configured to display each row and each column as shown. The rows and columns may be oriented to form the three-dimensional model placement grid. In this manner, each intersection of a row and a column may indicate a unit location within the three-dimensional model placement grid. Each unit location within the three-dimensional placement grid may be sized to fit a 3D object unit.

Additionally, the user may adjust the product height by providing an input on product height slider 546. The height of the product from the bottom or floor plane may be measured along a line perpendicular to bottom or floor plane 304 from the bottom or floor plane 304 to the bottom of square display 522. In other embodiments, the height of square display 522 may be measured from the bottom or floor plane 304 to the top of square display 522, from the bottom or floor plane 304 to the center of square display 522, or any other part of square display 522. Menu 560 may also display add products virtual button icon configured to superimpose additional 3D objects onto 2D environment 300.

Figure 5E:
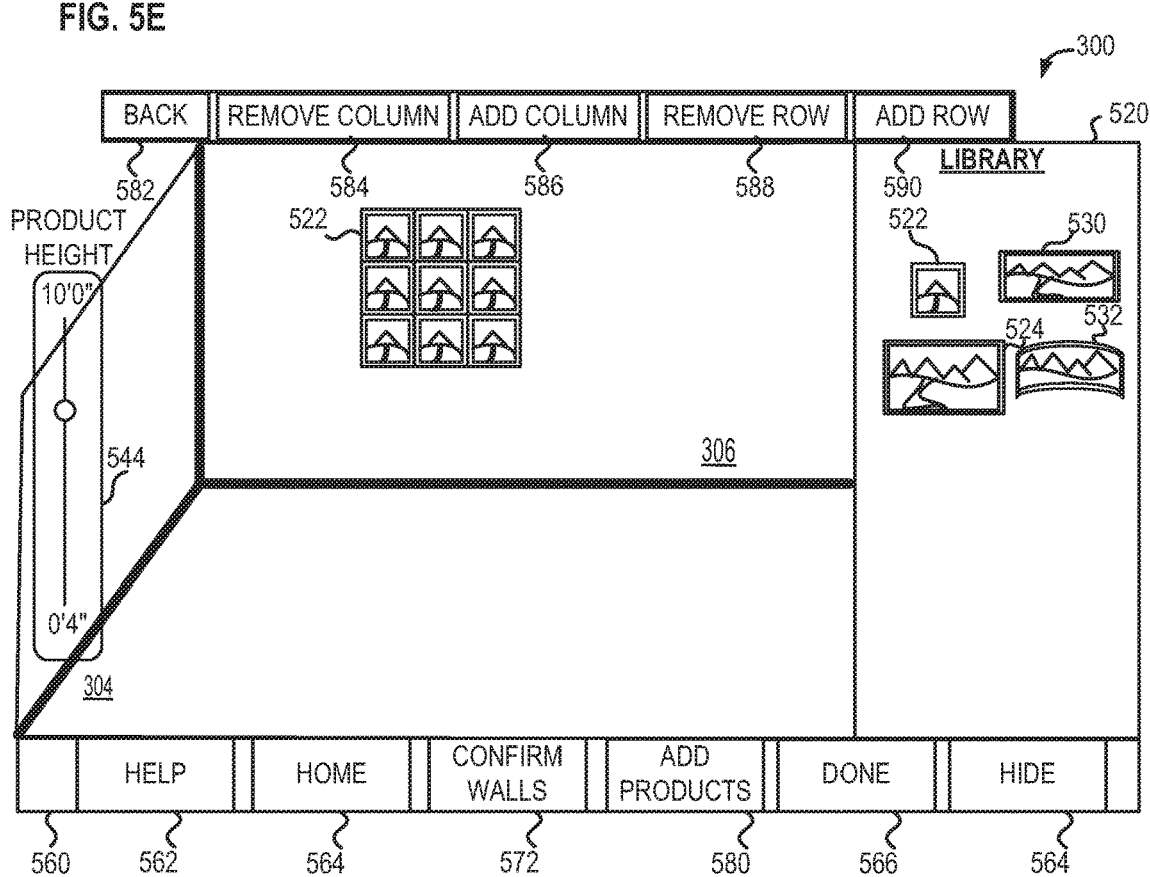

FIG. 5E illustrates the image of the 2D environment, after the user has finalized the placement of the three-dimensional model placement grid. A 3D object, square display 522, may be superimposed onto the 2D environment at each intersection of each row and each column. In this manner, each intersection of a row and a column may indicate a unit location within the three-dimensional model placement grid. As illustrated, a square display 522 may be superimposed onto the 2D environment at each intersection of each row and each column forming a three by three array of square displays 522. In some applications, the row and columns may be arranged to form composite displays composed of individual display units as illustrated.

Figure 5F:
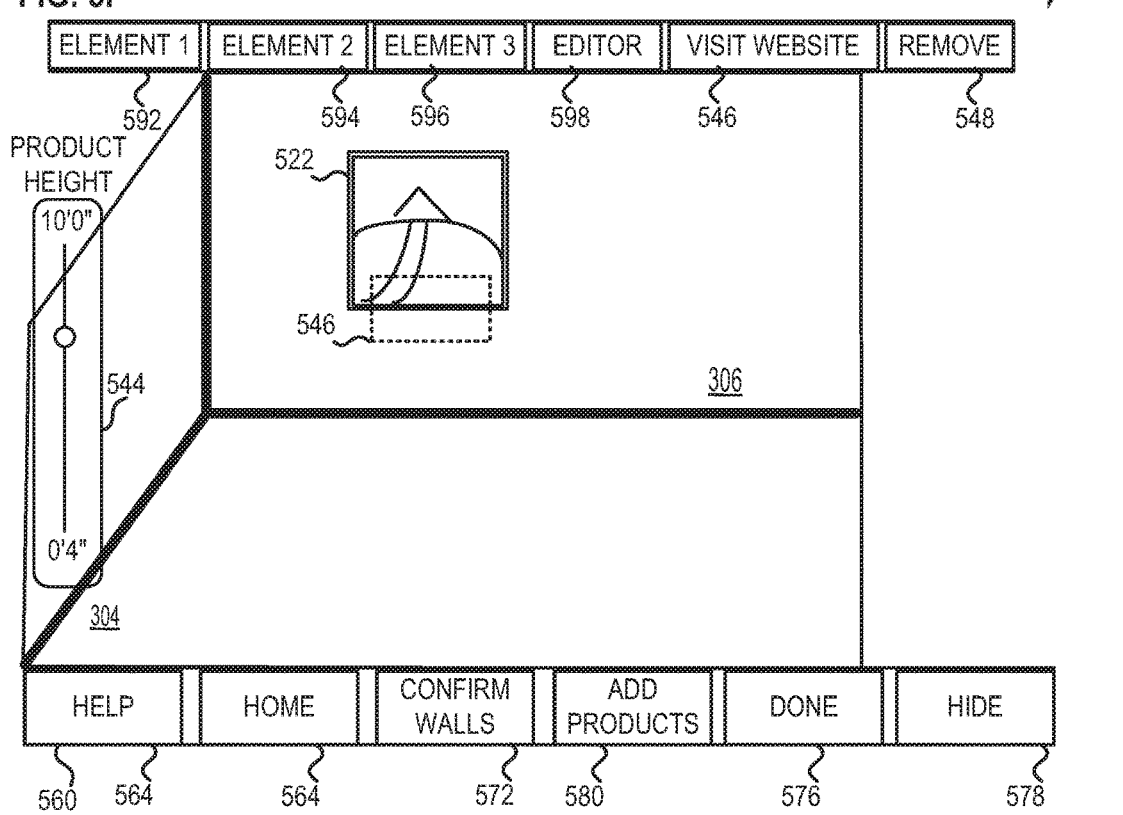

FIG. 5F illustrates an example three by three array of square displays 522 functioning as a composite display. The three by three array of square displays may be superimposed onto 2D environment 300 such that the three by three array of square displays may cover a two-dimensional object with the 2D environment such as television 546. Also illustrated in FIG. 5F are an additional menu of virtual button icons including, but not limited to, an element 1 virtual button icon 592 configured to display a visual display element, such as an image or video clip, on the three by three array of square displays, an element 2 virtual button icon 594 configured to display a different visual display element on the three by three array of square displays, an element 3 virtual button icon 596 configured to display another visual display element on the three by three array of square displays, an editor virtual button icon 598 configured to provide the user with editing functionality for generating a visual display element, a visit website virtual button icon 546 configured to direct the user to an application website, manufacturer website, or other website associated with the 3D object, and a remove virtual button icon 548 configured to remove a 3D object from t2D environment 300. It will be appreciated that in some embodiments, a visual display element may be displayed individually by each square display 522 of the three by three array.

In other applications, the rows and columns functionality may be employed to efficiently visualize any space with a regular and repeating 3D object unit. For example, a user may import a 2D environment of an empty amphitheater as described above. After providing perspective and scale to the amphitheater 2D environment, the user may quickly visualize the amphitheater with rows and columns of 3D models of a chairs. The user may add rows and columns of chairs to the 2D environment allowing the user to quickly and efficiently plan the seating layout for the amphitheater including seating, aisles, and other arrangements.

In another embodiment, the rows and columns functionality may be employed in a home decorating application. For example, a user may import a 2D environment of a room. After providing perspective and scale to the room 2D environment, the user may place carpet, laminate flooring, tile flooring, or other flooring squares within the room. In this application, the user may quickly and efficiently place the squares of carpet and flooring within the room, determine a quantity of the squares of carpet of flooring to cover the room, and in some embodiments provide an estimated cost to install the carpet or flooring. It will be appreciated that in some embodiments, other geometric shapes such as triangles, rectangles, circles, or any other geometric shape carpet of flooring may be used.

In other embodiments, each 3D object unit within the three-dimensional model placement grid may be moved collectively within the 2D environment. Additionally, each 3D object unit may be moved individually.

FIG. 6A illustrates an example flow chart of method 600 for determining the geometry of the 2D environment 300 and positioning of the 3D objects in the 2D environment 300. The method 600 may be performed by processing logic that may comprise hardware (e.g., programmable logic, microcode, and so forth), software (such as computer code executable on a general-purpose computer system or a specifically configured computer system), or a combination of both. The processing logic resides at the engine 200 for virtual visualization of 3D models of objects in 2D environment, as illustrated in FIG. 2. The method 600 may be performed by the various modules discussed above with reference to FIG. 2. Each of these modules may comprise processing logic.

Method 600 begins with determining geometry of the space 602 which includes operations 610, 620, 630, 640, and 650 and continues with positioning 3D objects 604 including operations 660, 670, and 680. At operation 610 of method 600 the user 120 may determine level of the ground plane, such as the level of the floor. In some examples, a gyroscope or other similar device may be used to determine the level of the floor. At operation 610 the receiving module 206 may receive scale and perspective data on ground plane 304 from the user. At operation 620, a ray may be projected from the camera lens 312 of the user device 130 and projected on the ground plane 304. At operation 630, the sensors 314 in the user device 130 may be configured to calculate the angle at which the ray from the camera lens reaches the ground plane.

At operation 640, the user may enter information concerning the height of the user device from the ground plane. The height of the mobile device may be approximated by the user or otherwise estimated such that scale may be determined as shown at operation 650. At operation 650, the scale and perspective module 220 may calculate the space geometry of the ground plane and scale based on the diagonal ray angle calculated by sensors 314 in the user device 130 and device height 330 provided by the user 120. The scale may be locked in using information regarding the ground level plan and the height of the device. In contrast to prior systems which incorporated a known target to determine scale, no additional target information or other details, other than the ground plane and device height (or similar height determination), are necessary in the disclosed example to determine scale.

Method 600 continues at operation 660, for positioning 3D models of objects. At operation 660, the receiving module 206 may receive a request to superimpose 3D models of objects onto the 2D environment. A superimposing request may include a user selecting the 3D object from the library 420 of 3D models of objects (in the engine for virtual visualization of 3D models of objects in 2D environment 300), from 3D models of objects saved or imported by the user, or 3D models of objects obtained from online resources.

At operation 670, the selected 3D object may be positioned on the 2D environment relative to the scale and perspective of the 2D environment defined in operations 610, 640 and 650. As discussed above in reference to FIG. 2, the moving module 216 may receive a request to move the 3D objects in the 2D environment. The request to move or reposition the 3D objects may include data on the selection of a direction by the user. As examples, the 3D objects may be moved in a vertical and/or horizontal direction. As another example, the 3D object may be rotated about a vertical, horizontal, and/or other rotational axis.

At operation 680, the user may place additional 3D objects in the 2D environment. For example, the user may decide to place a table in front of a lamp in the room. If the user is not satisfied with the positioning of the additional 3D object in the 2D environment, then the method 600 returns to operation 660. At operation 660, as discussed above, the user may continue repositioning the additional 3D object relative to the scale and perspective of the 2D environment.

Optionally, method 600 may include additional operations as shown in FIG. 6B. After the 3D object is positioned in space geometry relative to the ground plane and mobile device at operation 670, method 600 may optionally receive a number of rows at operation 672 and receive a number of columns at operation 674. Each row and column may be overlaid to generate a three-dimensional model placement grid. The three-dimensional model placement grid may be displayed as shown in FIG. 5B.

At operation 676, method 600 may optionally include positioning the 3D object at each intersection of each row and each column. After positioning the 3D object at each intersection of each row and each column of the three-dimensional model placement grid, method 600 may continue to operation 680.

FIG. 7 shows an example electronic form of a computer system 700, within which a set of instructions for causing a machine to perform any one or more of the methodologies discussed herein may be executed. The machine may be a PC, a tablet PC, a set-top box (STB), a PDA, a cellular telephone, a web appliance, a network router, switch or bridge, or any machine capable of executing a set of instructions (sequential or otherwise) that specify actions to be taken by that machine. In several example embodiments, the machine operates as a standalone device or may be connected to other machines (e.g., networked). In a networked disposition, the machine may operate in the capacity of a server or a client machine in a server-client network environment.

The example computer system 700 may be configured to include a processor or multiple processors 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT), and the like). The computer system 700 may also include an alphanumeric input device 712 (e.g., a keyboard, and the like), a cursor control device 714 (e.g., a mouse, touchpad, touchscreen, and the like), a disk drive unit 716 for reading computer readable medium (e.g., USB thumb drive, solid state memory drives, and the like), a signal generation device 718 (e.g., a speaker, and the like (e.g., network interface card, and the like)), and a network interface device 720.

Further, the disk drive unit 716 may include a computer-readable medium 722, on which is stored one or more sets of instructions and data structures (such as instructions 724) embodying or utilized by any one or more of the methodologies or functions described herein. Additionally, the instructions 724 may also reside, completely or partially, within the main memory 704 and/or within the processors 702 during execution by the computer system 700. The main memory 704 and the processors 702 may also constitute machine-readable media. Further still, the instructions 724 may be transmitted or received over a network 726 via the network interface device 720 utilizing any one of a number of well-known transfer protocols (e.g., Hyper Text Transfer Protocol (HTTP)).

The computer-readable medium 722 may include a single medium or multiple media (e.g., a centralized or distributed database and/or associated caches and servers) that store the one or more sets of instructions. The term "computer-readable medium" may further include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. Further, "computer-readable medium" may further include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

It will be appreciated that the configurations and routines disclosed herein are exemplary in nature, and that these specific embodiments are not to be considered in a limiting sense, because numerous variations are possible. For example, the above technology can be applied to various 3D objects superimposed on various 2D environments. The subject matter of the present disclosure includes all novel and non-obvious combinations and sub-combinations of the various systems and configurations, and other features, functions, and/or properties disclosed herein.

The above-disclosed embodiments may be combined with one or more of the embodiments and disclosures in U.S. Provisional Patent Application No. 61/992,759 entitled "METHOD FOR FORMING WALLS TO ALIGN 3D OBJECTS IN 2D ENVIRONMENT", filed on May 13, 2014, one or more of the embodiments and disclosures in U.S. Provisional Patent Application No. 61/992,719 entitled "METHOD FOR PROVIDING A PROJECTION TO ALIGN 3D OBJECTS IN 2D ENVIRONMENT", filed May 13, 2014, one or more of the embodiments and disclosures in U.S. Provisional Patent Application No. 61/992,774 entitled "METHOD FOR MOVING AND ALIGNING 3D OBJECTS IN A PLANE WITHIN THE 2D ENVIRONMENT", filed May 13, 2014, one or more of the embodiments and disclosures in U.S. Provisional Patent Application No. 61/992,746 entitled "METHOD FOR REPLACING 3D OBJECTS IN 2D ENVIRONMENT", filed May 13, 2014, and/or one or more of the embodiments and disclosures in U.S. Provisional Patent Application 61/992,665 entitled "METHOD FOR INTERACTIVE CATALOG FOR 3D OBJECTS WITHIN THE 2D ENVIRONMENT", filed May 13, 2014. The entire contents of each provisional application referenced herein are hereby incorporated by reference for all purposes. For example, and not as a limitation, the embodiments herein may be combined with the elements and features disclosed in Provisional Application No. 61/992,759, in combination with one or more of the elements and features disclosed in Provisional Application No. 61/992,719, in combination with one or more of the elements and features disclosed in Provisional Application No. 61/992,774, in combination with one or more of the elements and features disclosed in Provisional Application No. 61/992,746, and/or in combination with one or more of the elements and features disclosed in Provisional Application No. 61/992,665. These combinations may include one or more features disclosed in one or more of the referenced provisional applications, including combinations of embodiments disclosed herein with features shown in one, two, three, four, or five of the provisional applications.

Further, the entire contents of each concurrently filed application, U.S. Pat. No. 10,678,960 entitled "METHOD FOR FORMING WALLS TO ALIGN 3D OBJECTS IN 2D ENVIRONMENT", which claims priority to U.S. Pat. No. 9,996,636 filed on May 12, 2015, U.S. Non-Provisional patent application Ser. No. 14/710,560 entitled "METHOD FOR PROVIDING A PROJECTION TO ALIGN 3D OBJECTS IN 2D ENVIRONMENT", filed May 12, 2015, U.S. patent Ser. No. 16/372,286 entitled "METHOD FOR MOVING AND ALIGNING 3D OBJECTS IN A PLANE WITHIN THE 2D ENVIRONMENT", which claims priority to U.S. Pat. No. 10,296,663 filed May 12, 2015, U.S. Pat. No. 10,635,757 entitled "METHOD FOR REPLACING 3D OBJECTS IN 2D ENVIRONMENT", which claims priority to U.S. Pat. No. 9,971,853 filed May 12, 2015, and/or U.S. Non-Provisional patent application Ser. No. 15/944,614 entitled "METHOD FOR INTERACTIVE CATALOG FOR 3D OBJECTS WITHIN THE 2D ENVIRONMENT", which claims priority to U.S. Pat. No. 10,002,208 filed May 12, 2015, referenced herein are hereby incorporated by reference for all purposes.

The foregoing description is illustrative of particular embodiments of the invention, but is not meant to be a limitation upon the practice thereof.

The foregoing discussion should be understood as illustrative and should not be considered limiting in any sense. While the inventions have been particularly shown and described with references to preferred embodiments thereof, it will be understood by those skilled in the art that various changes in form and details may be made therein without departing from the spirit and scope of the inventions as defined by the claims.

The corresponding structures, materials, acts and equivalents of all means or steps plus function elements in the claims below are intended to include any structure, material or acts for performing the functions in combination with other claimed elements as specifically claimed.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. A method for visualizing a three-dimensional model of an object in an environment, the method comprising:
    calculating a scale and a perspective for the three-dimensional model of the object in the environment based on a height of a user device relative to a ground plane of the environment and an angle formed between the ground plane and a light ray projected from the user device to the ground plane;
    calculating a space geometry and scale of the environment based on the height and angle;
    calculating a position for the three-dimensional model of the object in the environment based on the height and the angle for correctly placing the three-dimensional model of the object in the environment with respect to the space geometry and scale of the environment;
    superimposing the three-dimensional model of the object onto the environment at the position with the scale and perspective; and
    responsive to receiving an adjusted position of the user device, displaying the three-dimensional model of the object superimposed onto the environment with an updated scale and updated perspective relative to an updated space geometry and scale of the environment, wherein the updated scale and updated perspective of the three-dimensional model and the updated space geometry and scale of the environment are updated according to the adjusted position of the three-dimensional model of the object and the adjusted position of the user device.

2. The method of claim 1, further comprising determining a level of the ground plane of the environment and receiving the height of the user device relative to the ground plane.

3. The method of claim 2, further comprising determining a position of a camera used to capture the environment.

4. The method of claim 3, further comprising projecting the light ray from the user device to the ground plane and determining the angle formed between the ground plane and the light ray projected from the user device.

5. The method of claim 1, further comprising importing the environment to be used as a background for the three-dimensional model of the object.

6. The method of claim 1, wherein superimposing the three-dimensional model of the object includes:
- obtaining an image of the three-dimensional model of the object in space; and
- positioning the three-dimensional model of the object within the environment in a second position based upon the angle formed between the ground plane and the light ray projected from the user device.

7. The method of claim 6, wherein positioning the three-dimensional model of the object includes rotating the three-dimensional model of the object relative to the environment.

8. The method of claim 1, wherein the user device includes one of a mobile phone, a personal computer, a personal digital assistant, a tablet personal computer, a wearable computer device, and a three-dimensional scanner.

9. The method of claim 1, further comprising:
- receiving, from the user, a row request, the row request defining a number of rows of a three-dimensional model placement grid within the environment;
- receiving, from the user, a column request, the column request defining a number of columns of the three-dimensional model placement grid within the environment; and
- superimposing, based upon the row request and the column request, the three-dimensional model of the object at each intersection of each column and each row.

10. A system for visualization of a three-dimensional model of an object in an environment, the system comprising:
- a processor; and
- a storage device, the storage device containing instructions executable by the processor, comprising:
  - a receiving module configured to receive one or more requests from a user, the requests including one or more of a superimposing request, and a request for projection of a light ray from one or more user devices to a ground plane of the environment;
  - a saving module configured to calculate and save both a space geometry and a scale of the environment, the space geometry and the scale calculated based on a device height of the one or more user devices relative to the ground plane and an angle between the ground plane and the light ray projected from the one or more user devices to the ground plane, wherein the space geometry and scale of the environment are dynamically updated responsive to an adjusted angle between the ground plane and the light ray projected from the one or more user devices to the ground plane; and
  - a superimposing module configured to superimpose, based on the superimposing request and the space geometry and scale calculated, the three-dimensional model of the object onto the environment with a scale and a perspective calculated based on the scale of the environment;
- wherein the receiving module is further configured to receive one or more of an updated position of the one or more user devices and an updated position of the three-dimensional model of the object within the environment, wherein the superimposing module is further configured to adjust the scale and the perspective of the three-dimensional model of the object according to the updated position of the one or more user devices or the updated position of the three-dimensional model of the object.

11. The system of claim 10, wherein the receiving module is further configured to determine the ground plane of the environment and to receive the device height relative to the ground plane.

12. The system of claim 10, further comprising a visualizing module configured to receive one or more of the superimposing request from the user, the superimposing request including data describing the three-dimensional model of the object, an object replacement request, a request to adjust one or more lighting characteristics of the environment, and a scale data and perspective data request.

13. The system of claim 12, further comprising an adding scale and perspective module configured to:
- receive the scale data and perspective data request from the visualizing module;
- receive a request from the user to change a scale and a perspective of the environment to change a perspective environment from a first display characteristic including one or more of a first scale and a first perspective to a second display characteristic including one or more of a second scale and a second perspective; and
- display the environment with the second display characteristic.

14. The system of claim 11, further comprising a moving module configured to receive a request to move the three-dimensional model of the object within the environment from a first location to a second location and superimpose the three-dimensional model of the object onto the environment at the second location.

15. The system of claim 11, further comprising a spinning module configured to:
- receive a request to spin the three-dimensional model of the object about an axis of rotation of the three-dimensional model of the object from a first rotational orientation to a second rotational orientation; and
- superimpose the three-dimensional model of the object onto the environment with the second rotational orientation.

16. The system of claim 12, wherein the visualizing module is further configured to:
- receive a row request, the row request defining a number of rows of a three-dimensional model placement grid within the environment;
- receive a column request, the column request defining a number of columns of the three-dimensional model placement grid within the environment; and
- superimpose, based upon the row request and the column request, the three-dimensional model of the object at each intersection of each column and each row.

17. A system for visualization of a three-dimensional model of an object in an environment, the system comprising a processor, a storage device, and instructions on the storage device executable by the processor, comprising:
- a receiving module configured to receive one or more requests from a user, the requests including one or more of an import request, a scale data request, a superimposing request, and a request for projection of a light ray from one or more user devices to a ground plane of the environment;
- an importing module configured to import, based on the import request of the user, only a single image of the environment;
- a visualizing module configured to receive one or more of the superimposing request from the user, the superimposing request including data describing the three-dimensional model of the object, an object replacement request, a request to adjust one or more lighting characteristics of the environment, and a scale data and perspective data request;

a saving module configured to save both a space geometry and scale of the environment, the space geometry and the scale of the environment calculated based on a device height of the one or more user devices from a ground plane and an angle between the ground plane and the light ray projected from the one or more user devices to the ground plane, wherein the ground level establishes the ground plane of the environment in a three-dimensional model of the environment, wherein the space geometry and scale of the environment are dynamically updated responsive to an adjusted angle between the ground plane and the light ray projected from the one or more user devices to the ground plane; and a superimposing module configured to superimpose, based on the superimposing request and the ground level calculated, the three-dimensional model of the object onto the environment with a scale and a perspective relative to the environment calculated based on the device height and the angle.

18. The system of claim 17, further comprising an adding scale and perspective module configured to:

receive the scale data and perspective data request from the visualizing module;

receive a request from the user to change a scale and a perspective of the environment to change a perspective environment from a first display characteristic including one or more of a first scale and a first perspective to a second display characteristic including one or more of a second scale and a second perspective; and display the environment with the second display characteristic.

19. The system of claim 17, further comprising:

a moving module configured to receive a request to move the three-dimensional model of the object within the environment from a first location to a second location and superimpose the three-dimensional model of the object onto the environment at the second location; and a spinning module configured to receive a request to spin the three-dimensional model of the object about an axis of rotation of the three-dimensional model of the object from a first rotational orientation to a second rotational orientation and superimpose the three-dimensional model of the object onto the environment with the second rotational orientation.

20. The system of claim 17, wherein the visualizing module is further configured to:

receive a row request, the row request defining a number of rows of a three-dimensional model placement grid within the environment;

receive a column request, the column request defining a number of columns of the three-dimensional model placement grid within the environment; and superimpose, based upon the row request and the column request, the three-dimensional model of the object at each intersection of each column and each row.

* * * * *